US009834035B2

(12) United States Patent
Chinavare

(10) Patent No.: US 9,834,035 B2
(45) Date of Patent: *Dec. 5, 2017

(54) AERODYNAMICALLY EFFICIENT SPOKE DESIGN FOR A VEHICLE WHEEL

(71) Applicant: Lacks Enterprises, Inc., Grand Rapids, MI (US)

(72) Inventor: Kevin Chinavare, Middleville, MI (US)

(73) Assignee: Lacks Enterprises, Inc., Grand Rapids, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/166,834

(22) Filed: May 27, 2016

(65) Prior Publication Data

US 2016/0272000 A1 Sep. 22, 2016

Related U.S. Application Data

(63) Continuation-in-part of application No. 14/212,914, filed on Mar. 14, 2014, now Pat. No. 9,352,612.
(Continued)

(51) Int. Cl.
*B60B 3/10* (2006.01)
*B60B 7/18* (2006.01)
(Continued)

(52) U.S. Cl.
CPC .............. *B60B 3/10* (2013.01); *B60B 1/12* (2013.01); *B60B 3/007* (2013.01); *B60B 7/0066* (2013.01);
(Continued)

(58) Field of Classification Search
CPC .... B60B 3/10; B60B 1/08; B60B 1/12; B60B 3/007; B60B 7/0066; B60B 7/02; B60B 7/06
See application file for complete search history.

(56) References Cited

U.S. PATENT DOCUMENTS 6,068,350 A 5/2000 Baumgarten
6,106,075 A 8/2000 Suenaga
(Continued)

FOREIGN PATENT DOCUMENTS

DE 102007042609 A1 3/2009
DE 202009013418 U1 2/2011
(Continued)

OTHER PUBLICATIONS

International Search Report (PCT/US2013/071993) Filing date: Nov. 26, 2013.

*Primary Examiner* — Hau V Phan
(74) *Attorney, Agent, or Firm* — John S. Artz; Dickinson Wright PLLC

(57) ABSTRACT

A wheel including an inner hub portion configured to receive a vehicle axle therethrough and defining an axis of rotation at a center thereof. A plurality of wheel spoke portions extend generally between the inner hub portion and an outer rim portion. A clad spoke overlies each of the wheel spoke portions. Each of the clad spokes includes an outboard surface overlying an outboard side of the wheel spoke portion, a leading side surface overlying a leading side surface of the wheel spoke portion, and a trailing side surface overlying a trailing side surface of the wheel spoke portion. At least a segment of one of the leading side and trailing side surfaces of the clad spoke has a non-planar shape. A foam adhesive is disposed between the wheel spoke and the clad spoke and may overly the inboard surface of each of the wheel spokes.

19 Claims, 11 Drawing Sheets

Related U.S. Application Data

(60) Provisional application No. 61/793,605, filed on Mar. 15, 2013.

(51) Int. Cl.
  *B60B 7/06* (2006.01)
  *B60B 1/12* (2006.01)
  *B60B 3/00* (2006.01)
  *B60B 7/02* (2006.01)
  *B60B 7/00* (2006.01)
  *B60B 1/08* (2006.01)

(52) U.S. Cl.
  CPC .............. *B60B 7/02* (2013.01); *B60B 7/06* (2013.01); *B60B 7/18* (2013.01); *B60B 1/08* (2013.01); *B60B 2900/1216* (2013.01); *Y02T 10/88* (2013.01)

(56) References Cited

U.S. PATENT DOCUMENTS

| | | |
|---|---|---|
| 6,346,159 B1 | 2/2002 | Chase |
| 6,547,341 B1 | 4/2003 | Griffin |
| 6,637,832 B2 | 10/2003 | Wrase |
| 6,663,189 B2 | 12/2003 | Enomoto |
| 6,729,695 B2 | 5/2004 | Woelfel |
| 6,932,435 B2 | 8/2005 | Cutcher |
| 6,998,001 B2 | 2/2006 | Woelfel |
| 7,025,426 B2 | 4/2006 | Hogan |
| 7,494,192 B2 | 2/2009 | Chase |
| 7,767,046 B2 | 8/2010 | Chase |
| 7,784,185 B2 | 8/2010 | Murray |
| 7,785,452 B2 | 8/2010 | Wei |
| 8,020,945 B2 | 9/2011 | Takeda |
| 8,449,043 B2 | 5/2013 | McCorry |
| 9,352,612 B2 * | 5/2016 | Chinavare ............... B60B 3/10 |
| 2002/0185908 A1 | 12/2002 | Woelfel |
| 2003/0047987 A1 * | 3/2003 | Enomoto ............... B60B 1/08 |
| | | 301/37.101 |
| 2003/0067212 A1 | 4/2003 | Wrase |
| 2004/0169413 A1 | 9/2004 | Woelfel |
| 2007/0157470 A1 | 7/2007 | Murray |
| 2009/0302669 A1 | 12/2009 | Yee |

FOREIGN PATENT DOCUMENTS

| | | |
|---|---|---|
| EP | 1920948 A2 | 5/2008 |
| WO | 03031204 A3 | 10/2003 |

* cited by examiner

AERODYNAMICALLY EFFICIENT SPOKE DESIGN FOR A VEHICLE WHEEL

CROSS-REFERENCE TO RELATED APPLICATIONS

The present U.S. Continuation-in-Part application claims priority to U.S. Utility patent application Ser. No. 14/212,914 entitled "Aerodynamically Efficient Spoke Design for A Vehicle Wheel" filed on Mar. 14, 2014, which claims priority to U.S. Provisional Patent Application Ser. No. 61/793,605, filed on Mar. 15, 2013, and entitled "Aerodynamically Efficient Wheel Spoke Design", the disclosure of which is hereby incorporated by reference as though set forth fully herein.

TECHNICAL FIELD

The present disclosure relates generally to a wheel design that provides improved aerodynamic performance. More specifically, the present disclosure relates to (a) a design of a wheel spoke that yields minimal power usage from the pumping of air during rotation to provide improved aerodynamics and (b) a design of a wheel spoke that optimizes the air pressure gradients under and around the vehicle affecting overall vehicle coefficient of drag.

BACKGROUND OF THE INVENTION

With recent efforts directed toward energy conservation along with the continuing escalation of fuel prices, the automotive industry has put an emphasis on increasing the fuel economy of vehicles that are put onto the road. Efforts to improve the fuel economy of vehicles have resided in improving the operation and efficiency of their engines, reducing the weight of their bodies and chassis, and improving the aerodynamic characteristics of their bodies. While great strides have been made in enhancing vehicle fuel economy as a result of improvements in these areas, there is still significant room for further advancement.

Currently, the impact of the wheels and their effect on vehicle aerodynamics as well as fuel economy has been largely unappreciated. While there have been efforts to design and manufacture lighter weight wheels, such as through the removal of material from the spokes or the backsides of the wheel, the primary goal of these efforts has generally been cost considerations and not aerodynamics or fuel economy. Indeed, the prior efforts to remove material from the back side of the wheel spokes likely negatively affected the wheel aerodynamics.

More recently, the potential aerodynamic impact of vehicle wheels themselves has been considered and has focused on the size and shape of the wheel turbine openings. These considerations have largely ignored the fact that most wheel assemblies today employ covers or other structures over the wheel outboard surface that are designed to enhance the aesthetics of the wheel. Any aerodynamic benefit that may result from the design of the wheel alone is not maximized when a wheel cover or other aesthetic feature is secured to the outboard surface of the wheel that does not take into account the aerodynamics of the overall wheel assembly.

It would thus be desirable to provide a wheel that overcomes the disadvantages associated with current wheels and helps contribute to improved fuel efficiency of a vehicle.

SUMMARY OF THE INVENTION

It is therefore an aspect of the present disclosure to provide a wheel for a vehicle that provides improved aerodynamics.

It is a related aspect of the present disclosure to provide a wheel assembly for a vehicle that provides improved aerodynamics.

It is a further aspect of the present disclosure to provide a wheel that yields improved fuel economy for a vehicle.

It is another related aspect of the present disclosure to provide a wheel assembly that yields improved fuel efficiency for a vehicle.

According to these and other aspects of the disclosure, a wheel for a vehicle is provided. The wheel includes an inner hub portion configured to receive a vehicle axle therethrough and defining an axis of rotation at a center thereof. The wheel also includes an outer rim portion, and a plurality of wheel spoke portions extending generally between the inner hub portion and the outer rim portion. The inner hub portion, the outer rim portions, and the plurality of wheel spoke portions cooperate to form a wheel outer surface having a plurality of turbine openings. Each of the plurality of wheel spoke portions has an outboard side adjacent the wheel outer surface, an inboard side opposite the spoke outboard side, a leading side surface extending generally in a direction between the inner hub portion and the outer rim portion and between the outboard side and the inboard side, and a trailing side surface extending generally in a direction between the inner hub portion and the outer rim portion and extending between the outboard side and the inboard side. A plurality of clad spokes each overly one of the wheel spoke portions. The clad spokes each include an outboard surface overlying the outboard side of the wheel spoke portion, a leading side surface overlying the leading side surface of the wheel spoke portion, and a trailing side surface overlying the trailing side surface of the wheel spoke portion. At least a segment of one of the leading side and trailing side surfaces of each of the clad spokes has a non-planar shape.

According to a further aspect of the disclosure, a wheel for a vehicle is provided. The wheel includes an inner hub portion configured to receive a vehicle axle therethrough and defining an axis of rotation at a center thereof. The wheel also includes an outer rim portion, and a plurality of wheel spoke portions extending generally between the inner hub portion and the outer rim portion. The inner hub portion, the outer rim portions, and the plurality of wheel spoke portions cooperate to form a wheel outer surface having a plurality of turbine openings. Each of the plurality of wheel spoke portions has an outboard side adjacent the wheel outer surface, an inboard side opposite the spoke outboard side, a leading side surface extending generally in a direction between the inner hub portion and the outer rim portion and between the outboard side and the inboard side, and a trailing side surface extending generally in a direction between the inner hub portion and the outer rim portion and extending between the outboard side and the inboard side. A plurality of clad spokes each overly at least a segment of one of the wheel spoke portions. A foam adhesive is disposed between each of the wheel spoke and the overlying clad spoke. The foam adhesive overlies the inboard surface of each of the wheel spokes.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE INVENTION

For purposes of description herein, the terms "upper", "lower", "right", "left", "rear", "front", "vertical", "horizontal", and derivatives thereof shall relate to the disclosure as oriented in the FIGs and are intended merely for purposes of illustration and are not intended to be limiting. It is to be understood that the disclosure may assume various alternative orientations and features, except where expressly specified to the contrary. It is also to be understood that the specific devices and processes illustrated in the attached drawings, and described in the following specification are exemplary embodiments of the inventive concepts defined in the appended claims. The specific dimensions and other physical characteristics relating to the aspects disclosed herein are not to be considered as limiting, unless the claims expressly state otherwise.

The present disclosure relates generally to a wheel and a wheel assembly for an automobile that can provide reduced power usage as well as improved vehicle aerodynamics and fuel economy. The amount of fuel economy savings can vary based upon other factors, including the configuration of the vehicle and whether the savings may be measured based on city or highway driving. According to an aspect, assuming the same vehicle, the disclosed wheel and wheel assembly can provide benefits over conventional wheels and wheel assemblies. The disclosed wheel and wheel assembly are intended for use with an automotive vehicle, such as a car or truck. In accordance with another aspect, the wheel and wheel assembly could alternatively be used in connection with other types of vehicles.

Figure 1:
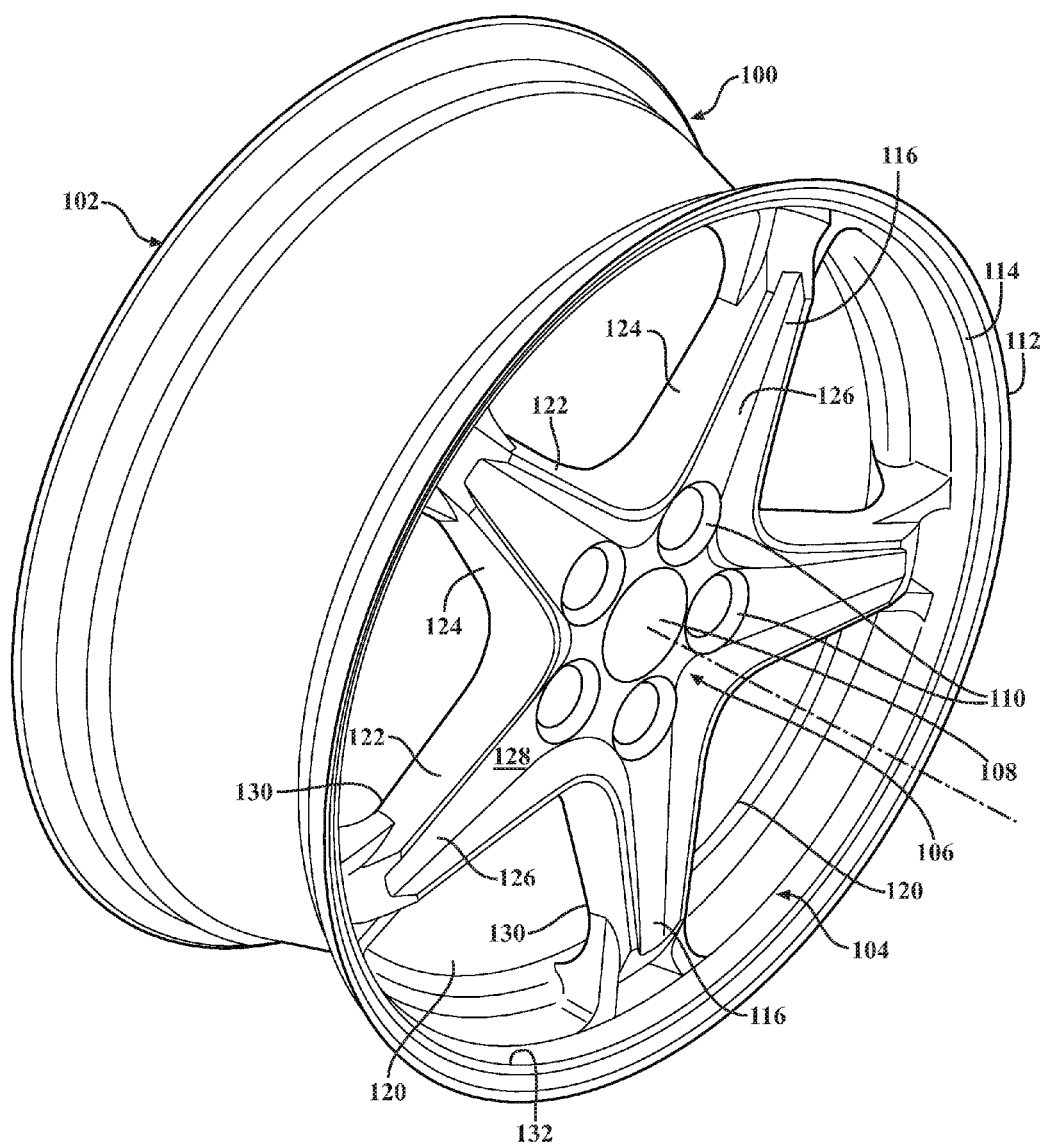
FIG. 1 is a perspective view of an exemplary wheel.
Figure 2:
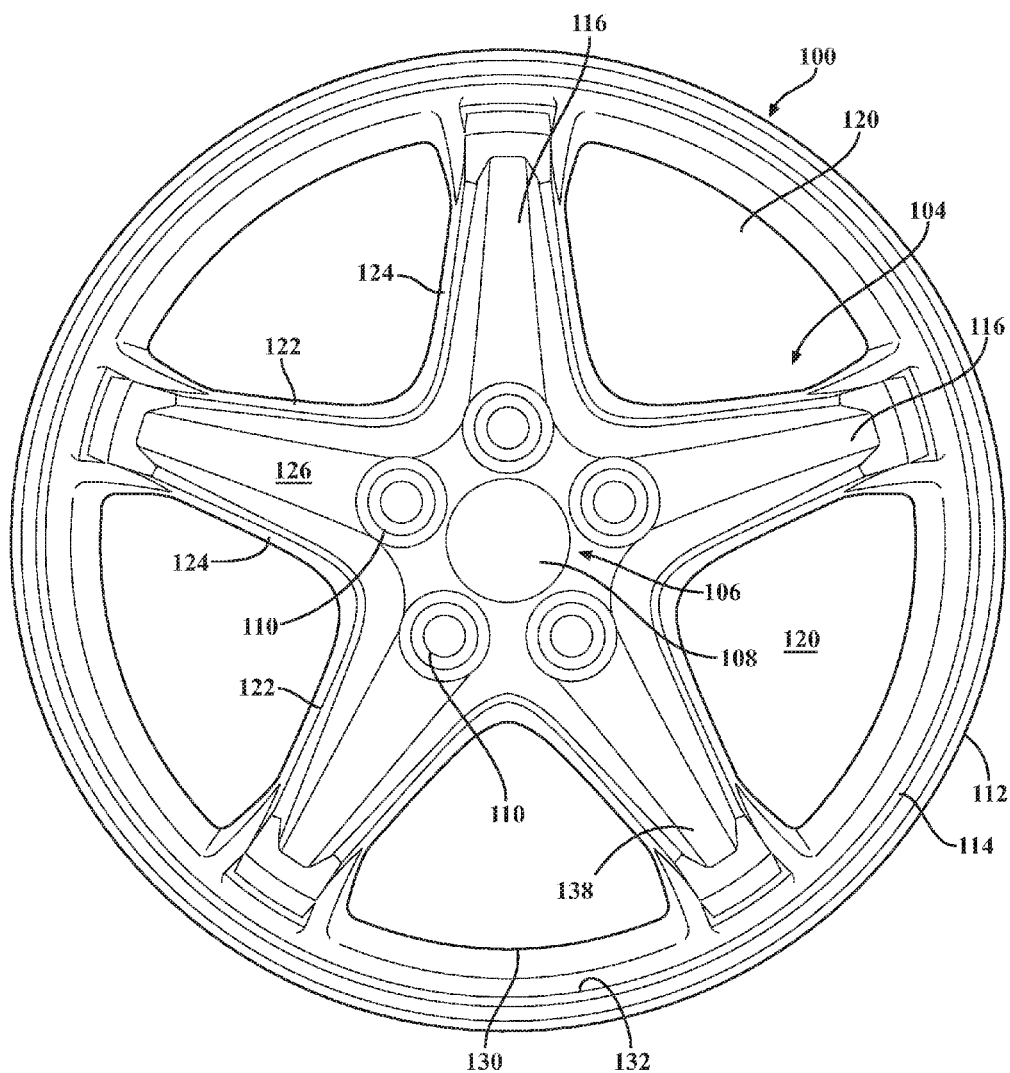
FIG. 2 is a front view of an exemplary wheel.
Figure 3:
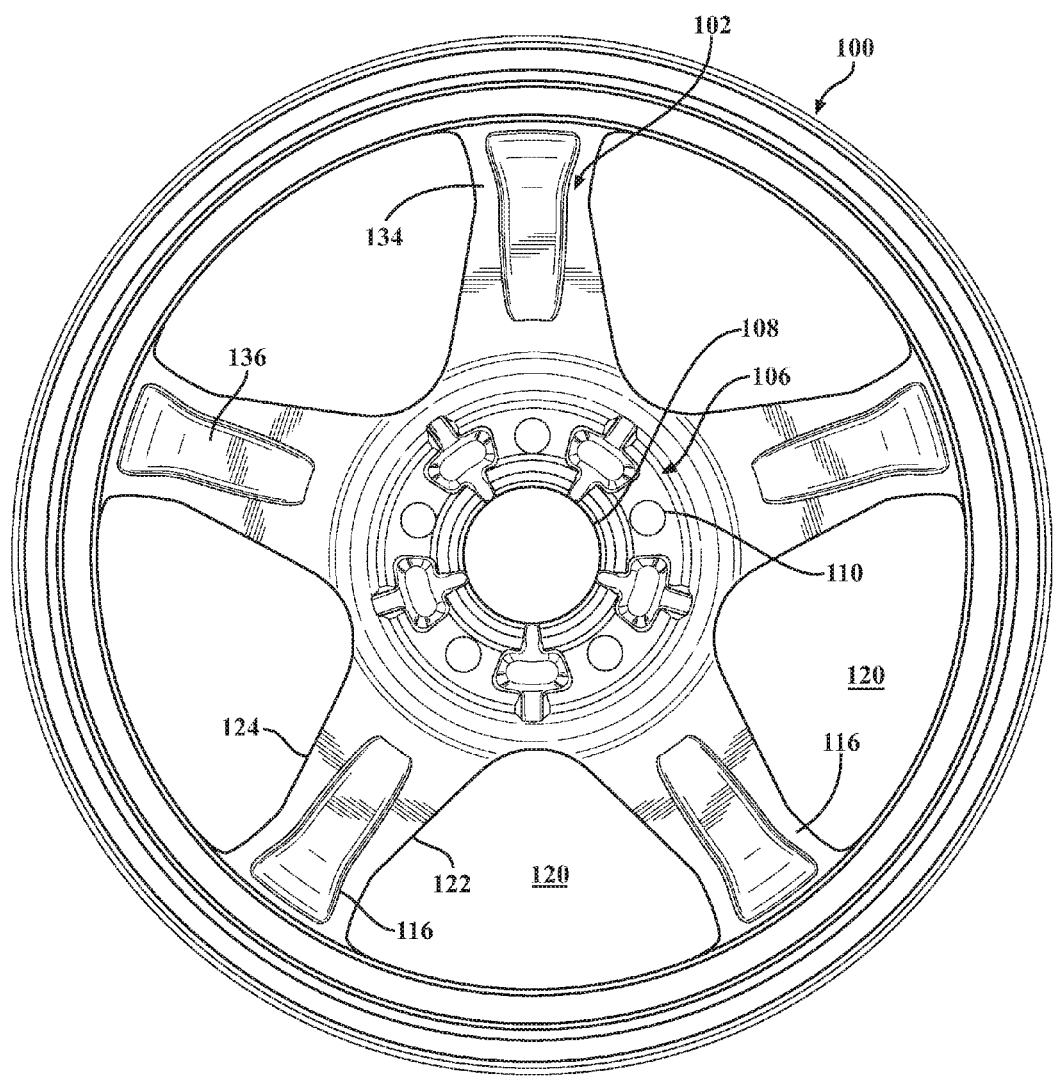
FIG. 3 is a back view of an exemplary wheel.

FIGS. 1 through 3 generally illustrate a wheel 100 in accordance with an aspect of the disclosure. According to an aspect, the wheel 100 has an inboard side 102 and an outboard side 104 and includes an inner hub portion 106 having an opening 108 for receipt of an axle (not shown) therethrough. The center of the opening 108 defines an axis of rotation. The hub portion 106 also includes a plurality of lug openings 110 formed therein which receive lug bolts (not shown), for securing the wheel 100 for rotation with a vehicle axle. The wheel 100 also includes a peripheral rim portion 112 with an outer peripheral flange surface 114. The wheel 100 additionally includes a plurality of wheel spokes 116 extending generally radially between the outer peripheral flange surface 114 and the inner hub portion 106. The outer peripheral flange surface 114, the inner hub portion 106, and the plurality of spokes 116 together define a plurality of wheel turbine openings 120. The wheel turbine openings 120 are generally defined by an inner boundary or footprint. The spokes and turbine openings may have a variety of different sizes, shapes and geometries and may be defined by a variety of different surfaces. Additionally, the wheel may employ any number of spokes.

As shown, the wheel turbine opening perimeter 130 may be generally defined by inner side surfaces 122, 124 of adjacent spokes 116 and an inner periphery 132 of the outer peripheral flange surface 114. The wheel turbine openings 120 can have a variety of different shapes and sizes, including non-uniform shapes. Additionally, any number of turbine openings 120 can be formed in the wheel surface 110. According to an aspect, the wheel 100 can be formed from any suitable material, such as aluminum or steel, as is conventional in the automotive industry. Other materials may alternatively be employed. Additionally, any conventional forming or manufacturing process may be employed.

Figure 4:
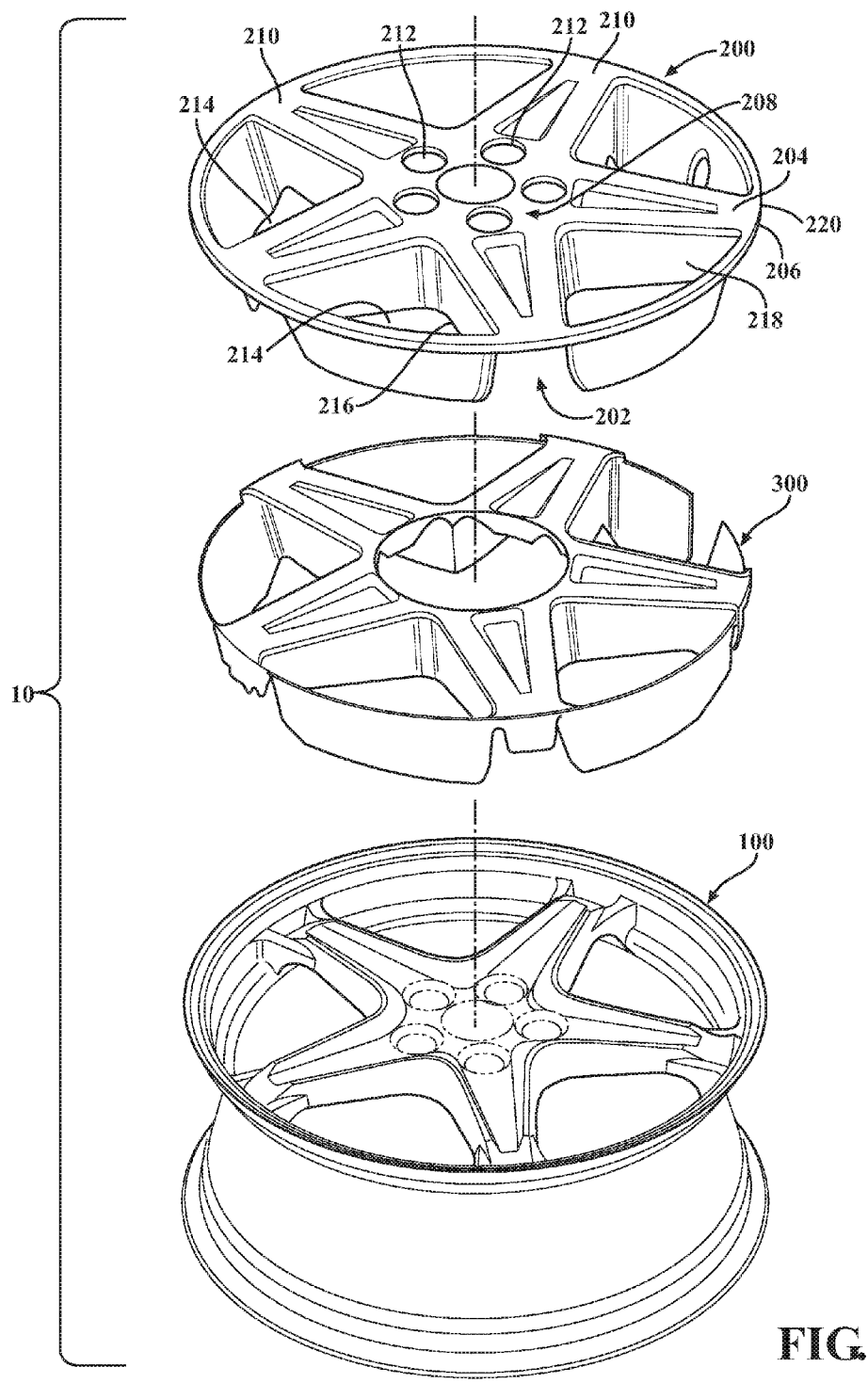
FIG. 4 is an exploded view of an exemplary wheel assembly.

FIG. 4 generally illustrates a wheel assembly 10 in accordance with an aspect of the disclosure. Pursuant to an aspect, the wheel assembly 10 includes a wheel 100 and a wheel cover or clad 200 designed to overlie the outboard side 104 of the wheel such as for aesthetic purposes. The wheel clad 200 can be permanently secured to the wheel 100 by a suitable adhesive to form a completed wheel assembly 10. According to an aspect, the wheel clad 200 may be secured to the wheel 100 by foam adhesive, as generally designated by reference number 300. According to another aspect, any other suitable adhesive may be employed. For example, a silicon adhesive, such as a one part or two part RTV adhesive, may be employed.

As generally shown, the wheel clad 200 has an inboard surface 202 and an outboard surface 204. The wheel clad 200 has a clad outer peripheral portion 206 that is intended to axially align with or overlie at least a portion of the wheel outer peripheral flange surface 114. The wheel clad 200 also includes a hub portion 208 that can be axially aligned with at least a portion of the wheel inner opening portion 106. The wheel clad 200 also can include a plurality of clad spokes 210 that extend radially between the clad outer peripheral portion 206 and the clad inner opening portion 208. The clad spokes 210 may at least partially align with and overlap the wheel spokes 116. The clad outer peripheral portion 206, the clad inner opening portion 208, and the clad spokes 210 cooperate to define a plurality of clad turbine openings 214. The clad 200 also can include a plurality of lug bolt receiving holes 212 formed therein for receiving lugs. It will be appreciated that the clad turbine openings 214 according to the present disclosure can have a variety of different sizes and shapes and can be located in different places on the clad 200.

The wheel clad 200 may be permanently secured to the wheel 100 such that the clad inboard surface 202 faces the wheel outboard side 104. The plurality of clad turbine openings 214 can each have a clad turbine opening perimeter 216 that may be defined by opposing side surfaces 218 of adjacent clad spokes 210 and an inner periphery 220 of the clad outer rim portion 206. As shown, the opposing side surfaces 218 may extend downward toward the wheel outboard surface 104 in a generally planar fashion. The plurality of clad turbine openings 214 may be generally axially aligned with the wheel turbine openings 120, such that each clad turbine opening perimeter 216 may be disposed entirely within a respective one of the wheel turbine openings 120.

According to a further aspect, the wheel clad 200 may be constructed of plastic or composite material. However, other suitable materials may be employed as may be preferred or dictated by the design constraints of the particular application. According to another aspect, the wheel clad 200 may have a metal plated outer surface, such as a chrome plated surface, to provide desirable aesthetics and to yield an appearance that the clad is an integral part of the wheel. Numerous structural combinations of wheel dads with chrome-plated outboard surfaces have attracted great interest from vehicle manufacturers, because they are lightweight, aesthetically pleasing and offer designers complete flexibility with regard to the aesthetic effect that can be created for a specific vehicle regardless of whether these vehicles use steel or aluminum wheels. The clad 200 may be formed by suitable injection molding processes.

Known efforts to reduce the weight of conventional wheels and wheel assemblies has involved removing weight from the inboard side of the wheel. One such exemplary weight removal structure is as a weight reduction pocket which is formed on the inner surface 134 of the wheel spokes 116. Exemplary weight reduction pockets 136 formed on the inner surface 134 of the wheel spoke 116 are generally illustrated in FIG. 3.

Figure 5:
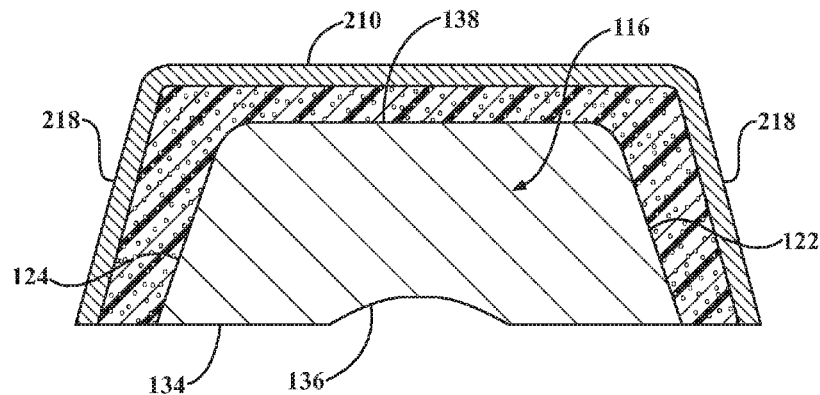
FIG. 5 is schematic cross-sectional illustration of a configuration of a wheel spoke in accordance with the prior art.

A weight reduction pocket 136 is also illustrated in FIG. 5, which schematically illustrates a conventional wheel spoke design for a wheel assembly. As shown in FIG. 5, the wheel spoke 116 may be a generally cast metal structure that has a generally uniform cross-section. The wheel spoke 116 has an inner surface 134, an outer surface 138 and a pair of spoke inner side surfaces 122, 124, which extend between the inner surface 134 and the outer surface 138. As shown, a clad spoke 210 can overlie the wheel spoke 116 and encapsulates it on three sides. An adhesive, generally designated by reference number 300, can fill the area between the inboard surface 202 of the clad spoke 210 and the outboard side 104 of the wheel spoke 116. The inner surface 134 of the wheel spoke 116 may be machined and have a weight reduction pocket 136 formed therein through the removal of material. As shown, the weight reduction pocket 136 can be formed as a depression or recess generally in the middle portion of the inner surface 134 of the wheel spoke 116. While this feature serves to lighten the wheel, it negatively impact aerodynamics of the inboard side 104 of the wheel 100.

According to an aspect of the present disclosure, the aerodynamics of the wheel may be improved by altering the shape of the back, rear or inboard side of the wheel spoke. More specifically, according to an aspect, the inboard side of the wheel spoke can be formed to create an efficient surface that does not pump air, in the same fashion as a propeller or fan would. According to another aspect, the inboard side of the wheel can be formed to minimize the power used to rotate the wheel through the air or can be formed to create an effect that provides a pressure differential between the inboard side and the outboard side of the wheel, allowing the evacuation of high pressure air from underneath the vehicle, thereby reducing the overall drag coefficient of the wheel and vehicle. According to another aspect, the orientation of each of the spokes may be changed to provide an aerodynamic benefit, as discussed above.

Figure 6:
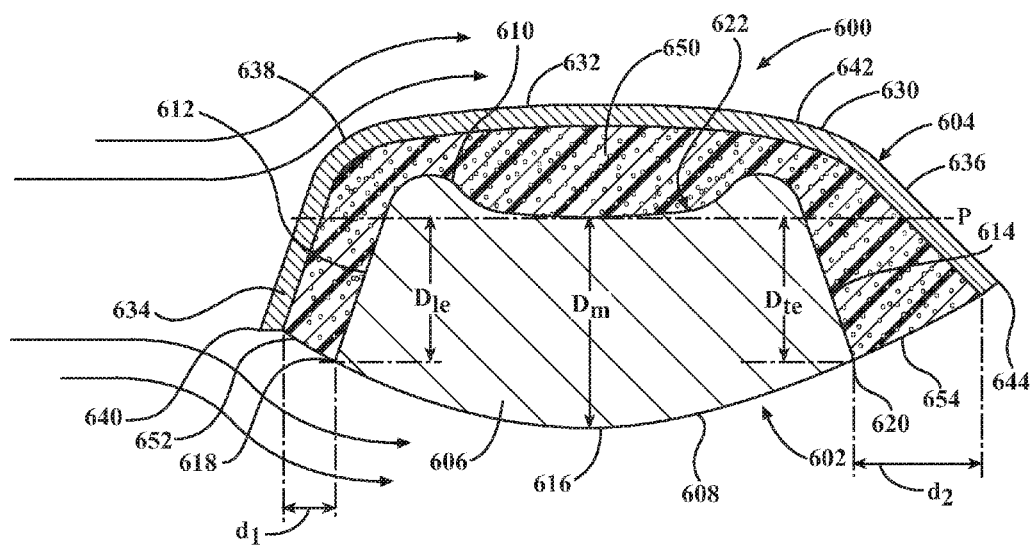
FIG. 6 is a schematic cross-sectional illustration of a wheel spoke for a wheel assembly in accordance with an aspect of the present disclosure.

FIG. 6 illustrates one exemplary design for a wheel assembly that yields improved aerodynamics. As shown, FIG. 6 is a cross-section of a portion of wheel assembly 600 according to an aspect of the present disclosure, which yields improved aerodynamics through altering the configuration of the inboard side of the wheel. As shown, the wheel assembly 600 can include a wheel 602 and a wheel clad 604 and the basic components of the wheel and wheel clad may be configured as discussed above. The differences may reside in the configuration of the wheel spoke and the clad spoke.

According to an aspect, the wheel spoke 606 has an inboard surface 608, an outboard surface 610, a leading surface 612 extending between the inboard surface 608 and the outboard surface 610, and a trailing surface 614 extending between the inboard surface 608 and the outboard surface 610. According to another aspect, the inboard surface 608 may be configured as a generally convex shape such that it is generally arcuate in a direction from the leading surface 612 to the trailing surface 614 with a generally middle portion 616 of the inboard surface 608 is bowed away from the outboard surface 610 of the spoke 606. Put another way, the generally middle portion 616 may be disposed a distance ($D_m$) away from a reference plane (P) defined by the outboard surface 610 of the spoke 606. An inner edge 618 of the leading surface 612 may be disposed a distance ($D_{le}$) from the reference plane (P). An inner edge 620 of the trailing surface 614 may be disposed a distance ($D_{te}$) from the reference plane (P). According to an aspect, the distance ($D_m$) may be greater than each of distance ($D_{le}$) and distance ($D_{te}$). According to another aspect, distance ($D_{le}$) may be equal to distance ($D_{te}$). However, distances ($D_{le}$) and ($D_{te}$) do not need to be equal.

According to an aspect, the outboard surface 610 of the wheel spoke 606 can include a weight reduction pocket 622, which can serve to decrease the amount of material that is required to form the wheel spoke thus making the wheel spoke lighter and less expensive. The weight reduction pocket 622 may be sized and shaped in order to maximize the removal of material without compromising the strength or structural integrity of the wheel spoke. The weight reduction pocket may obviously take on a variety of different shapes. Alternatively, instead of a weight reduction pocket, other weight reducing or relief structures may be employed. According to an aspect, the inboard surface of the wheel spoke may be left as-cast. Alternatively, the inboard surface of the spoke could include machining to achieve brake clearance tolerances. Additionally, by placing the weight reduction pocket on the outboard surface 610 of the spoke 606, the inboard side of the spoke can be shaped to have increased aerodynamic effect. According to a still further aspect, the spoke 606 could be rotated either clockwise or counterclockwise (as viewed in FIG. 6) about its center such that the inboard surface 608 is angled either downwardly or upwardly with respect to the clad leading surface 634.

According to another aspect, a clad spoke 630 can overlie the wheel spoke 606. The clad spoke 630 can include an outboard surface 632, a leading side surface 634, and a trailing side surface 636. According to a further aspect, the leading side surface 634 has an outer edge 638 and an inner edge 640. The trailing side surface 636 also has an outer edge 642 and an inner edge 644. As shown, the inner edge 638 of the leading side surface 634 of the clad spoke 630 may be spaced a first distance ($d_1$) from the inner edge 618 of the leading surface 618 of the wheel spoke 606. As also shown, the inner edge 644 of the trailing side surface 636 of the clad spoke 630 may be spaced a second distance ($d_2$) from the inner edge 620 of the trailing surface 612 of the wheel spoke 606. According to an aspect, the first distance ($d_1$) may be greater than the second distance ($d_2$). According to another aspect, the first distance ($d_1$) may be substantially greater than the second distance ($d_2$). According to a further aspect, the leading surface 618 of the wheel spoke 606 may be oriented substantially parallel to the leading side surface 634. As also shown, the trailing surface 614 of the wheel spoke 606 may be oriented such that it is not parallel to the trailing side surface 636. Put another way, the leading side surface 634 can be disposed at an angle ($\alpha$) with respect to the outboard surface 632 which angle may be less than an angle ($\theta$) as measured between the trailing side surface 636 and the outboard surface 632.

According to another aspect, foam adhesive 650 may be utilized to fill an area between the wheel spoke 606 and the clad spoke 630. According to another aspect, foam adhesive can be utilized to assist in forming at least a portion of an inboard surface 608 of the wheel spoke 606. As shown, a first foam portion 652 can extend between the inner edge 640 of the leading side surface 634 of the clad surface 630 and the inner edge 618 of the leading surface 612 of the wheel spoke 606. According to an aspect, the first foam portion 652 may be disposed flush to the edges 618, 640 and configured to match a contour of the inboard surface 608 of the wheel spoke 606. As also shown, a second foam portion 654 can extend between the inner edge 644 of the trailing side surface 636 of the clad spoke 630 and the inner edge 620 of the trailing surface 614 of the wheel spoke 606. According to another aspect, the second foam portion 654 may be disposed flush to those edges 620, 644 and also configured to match a contour of the inboard surface 608 of the wheel spoke 606. In other words, the foam exposed on the back side of the wheel can be shaped to provide an aero-efficient surface as the front-side to rear-side surface geometry is achieved.

A spoke inboard surface 608 having this configuration can provide an aero-efficient shape that results from the configuration of both the outboard surface and the inboard surface to reduce pumping losses.

Figure 7:
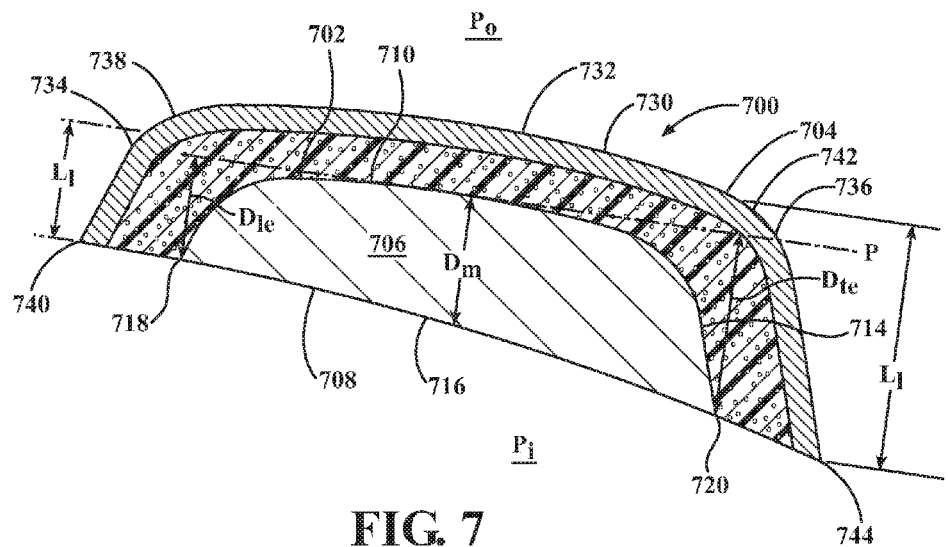
FIG. 7 is a schematic cross-sectional illustration of a wheel spoke for a wheel assembly in accordance with another aspect of the present disclosure.

FIG. 7 illustrates another exemplary design for a wheel assembly that yields improved vehicle aerodynamics through altering the configuration of the rear side of the wheel spoke. As shown, FIG. 7 is a cross-section of a portion of a wheel assembly 700 according to an aspect of the present disclosure. The wheel assembly 700 can include a wheel 702 and a wheel clad 704. The basic components of the wheel and the wheel clad may be configured as discussed above. The differences may reside in the configuration of the wheel spoke and the clad spoke.

According to an aspect, the wheel 702 includes the wheel spoke 706 having an inboard surface 708, an outboard surface 710, and a leading surface 712 extending between the inboard surface 708 and the outboard surface 710, and a trailing surface 714 extending between the inboard surface 708 and the outboard surface 710. According to another aspect, the inboard surface 708 may be configured as a generally concave shape such that it is generally arcuate in a direction from the leading surface 712 to the trailing surface 714 where a generally middle portion 716 of the inboard surface 708 is bowed toward from the outboard surface 710 of the spoke 706. Put another way, the generally middle portion 716 may be disposed a distance ($D_m$) away from a reference plane (P) defined by the outboard surface 710 of the spoke 706. An inner edge 718 of the leading surface 712 can be disposed a distance ($D_{le}$) from the reference plane (P). An inner edge 720 of the trailing surface 714 may be disposed a distance ($D_{te}$) from the reference plane (P). According to an aspect, the distance ($D_m$) may be greater than the distance ($D_{le}$) and less than the distance ($D_{te}$). However, the relative distances can vary. By this configuration, the leading surface 712 may be shorter than the trailing surface 714. According to an aspect, the outboard surface 710 of the wheel spoke 706 as defined by the reference plane may be oriented at an angle with respect to the wheel outer surface. According to a further aspect, the wheel spoke 706 could be rotated (either clockwise or counter-clockwise) about a center point so that one of the leading surface 712 or the trailing surface 714 is lower with respect to the Plane (P) than the other. By this configuration, the length of these surfaces 712, 714 could be equal $L_1 = L_2$.

According to another aspect, a clad spoke 730 can overlie the wheel spoke 706. The clad spoke 730 can include an outboard surface 732, a leading side surface 734, and a trailing side surface 736. According to a further aspect, the leading side surface 734 has an outer edge 738 and an inner edge 740. The trailing side surface 736 also has an outer edge 742 and an inner edge 744. According to this aspect, the inner edge 738 of the leading side surface 734 of the clad spoke 730 may be spaced apart generally the same distance as the distance between the inner edge 744 of the trailing side surface 736 of the clad spoke 730 and the inner edge 720 of the trailing surface 712 of the wheel spoke 706. According to an aspect, the leading side surface 734 of the clad spoke 730 may have a shorter length ($L_l$) than the length ($L_t$) of the trailing side surface 736. This configuration can yield a pitch in the wheel spoke that creates a pressure differential between outboard pressure zone (Po) and the inboard pressure zone (Pi). Again, the pitch of the spoke could be created through rotation of the spoke about its center.

According to another aspect, foam adhesive 750 may be utilized to fill an area between the wheel spoke 706 and the clad spoke 730. According to another aspect, foam adhesive can be utilized to assist in forming an inboard surface 708 of the wheel spoke 706. As shown, a first foam portion 752 can extend between the inner edge 740 of the leading side surface 734 of the clad surface 730 and the inner edge 718 of the leading surface 712 of the wheel spoke 706. According to an aspect, the first foam portion 752 may be disposed flush to the edges 718, 740 are configured to match a contour of the inboard surface 708 of the wheel spoke 706. As also shown, a second foam portion 754 can extend between the inner edge 744 of the trailing side surface 736 of the clad spoke 730 and the inner edge 720 of the trailing surface 714 of the wheel spoke 706. According to another aspect, the second foam portion 754 may be disposed flush to those edges 720, 744 and also configured to match a contour of the inboard surface 708 of the wheel spoke 706. In other words, the foam exposed on the back side of the wheel can be shaped to provide an aero-efficient surface as the front-side to rear-side surface geometry is achieved.

A spoke inboard surface 708 having this configuration can provide an aero-efficient shape that results from the configuration of both the outboard surface and the inboard surface to reduce pumping losses.

Figure 8:
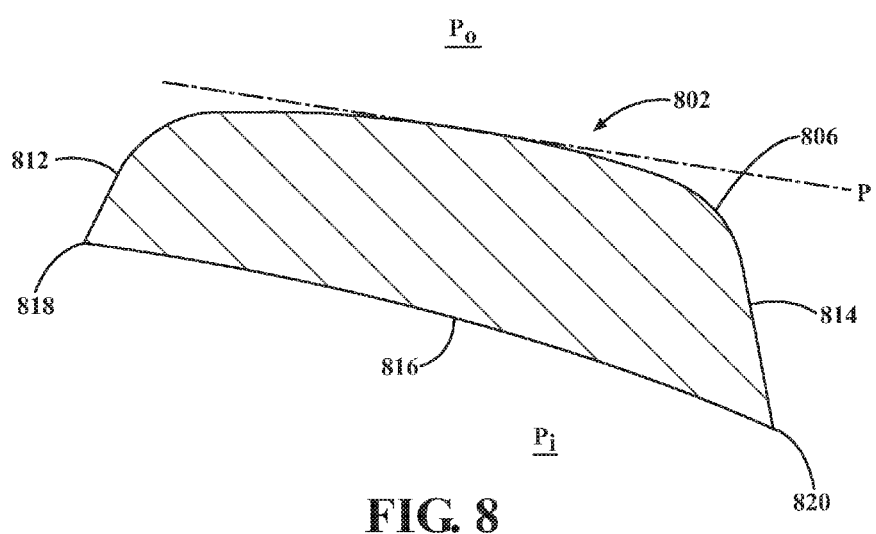
FIG. 8 is a schematic cross-sectional illustration of a wheel spoke design in accordance with still another aspect of the present disclosure.

FIG. 8 illustrates an exemplary design for a wheel that yields improved aerodynamics through altering the configuration of the inboard side of the wheel spoke. As shown, FIG. 8 is a cross-section of a portion of wheel 802 according to an aspect of the present disclosure. The basic components of the wheel may be configured, as discussed above. The differences may reside in the configuration of the wheel spoke. As shown, the wheel spoke 806 of FIG. 8 has the same configuration as the wheel spoke of FIG. 7. However, with respect to FIG. 8, there is no wheel clad disposed overtop of the wheel surface. The outboard surface 810 of the wheel spoke and thus the wheel is exposed. According to an aspect, the outboard surface of the wheel, including the wheel spoke geometry, are configured to provide the aerodynamic benefits.

Figure 9:
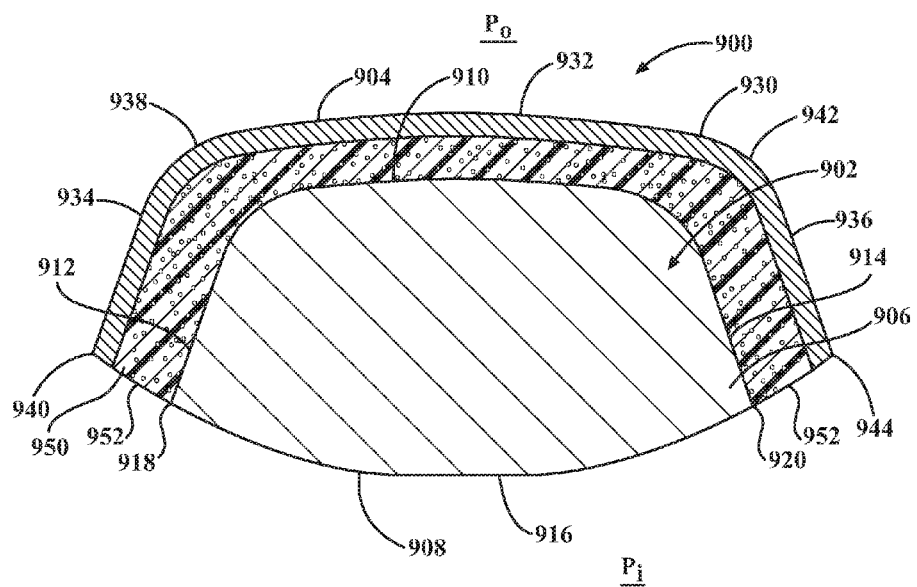
FIG. 9 is a schematic cross-sectional illustration of a wheel spoke design for a wheel assembly in accordance with yet another aspect of the present disclosure.

FIG. 9 illustrates still another exemplary design for a wheel assembly that yields improved aerodynamics through altering the configuration of the inboard side of the wheel spoke. As shown, FIG. 9 is a cross-section of a portion of wheel assembly 900 according to an aspect of the present disclosure. The wheel assembly 900 can include a wheel 902 and a wheel clad 904. The basic components of the wheel and wheel clad may be configured as discussed above. The differences can reside in the configuration of the wheel and clad spoke.

According to an aspect, the wheel spoke 906 has an inboard surface 908, an outboard surface 910, and a leading surface 912 extending between the inboard surface 908 and the outboard surface 910, and a trailing surface 914 extending between the inboard surface 908 and the outboard surface 910. According to another aspect, the inboard surface 908 can be configured as a generally convex shape such that it is generally arcuate in a direction from the leading surface 912 to the trailing surface 914 with a generally middle portion 916 of the inboard surface 908 that is bowed away from the outboard surface 910 of the spoke 906. Put another way, the generally middle portion 916 may be disposed a distance ($D_m$) away from a reference plane (P) defined by the outboard surface 910 of the spoke 906. According to another aspect, the middle portion 916 can be configured with at least a generally planar section for manufacturing purposes without altering the overall convex shape of the inboard surface 908. An inner edge 918 of the leading surface 912 may be disposed a distance ($D_{le}$) from the reference plane (P). An inner edge 920 of the trailing surface 914 may be disposed a distance ($D_{te}$) from the reference plane (P). According to an aspect, distance ($D_m$) may be greater than each of distance ($D_{le}$) and distance ($D_{te}$). According to another aspect, distance ($D_{le}$) may be equal to distance ($D_{te}$). However, distances ($D_{le}$) and ($D_{te}$) do not need to be equal.

According to another aspect, a clad spoke 930 can overlie the wheel spoke 906. The clad spoke 930 can include an outboard surface 932, a leading side surface 934, and a trailing side surface 936. According to a further aspect, the leading side surface 934 has an outer edge 938 and an inner edge 940. The trailing side surface 936 also has an outer edge 942 and an inner edge 944. As shown, the inner edge 938 of the leading side surface 934 of the clad spoke 930 may be spaced a first distance ($d_1$) from the inner edge 918 of the leading surface 918 of the wheel spoke 906. As also shown, the inner edge 944 of the trailing side surface 936 of the clad spoke 930 may be spaced a second distance ($d_2$) from the inner edge 920 of the trailing surface 912 of the wheel spoke 906. According to an aspect, the first distance ($d_1$) and the second distance ($d_2$) may be generally equal. According to a further aspect, the leading surface 918 of the wheel spoke 906 may be oriented substantially parallel to the leading side surface 934 of the wheel spoke. As also shown, the trailing surface 914 of the wheel spoke 906 may also be oriented substantially parallel to the trailing side surface 936 of the clad spoke.

According to another aspect, foam adhesive 950 may be utilized to fill an area between the wheel spoke 906 and the clad spoke 930. According to another aspect, foam adhesive can be utilized to assist in forming an inboard surface 908 of the wheel spoke 906. As shown, a first foam portion 952 may extend between the inner edge 940 of the leading side surface 934 of the clad surface 930 and the inner edge 918 of the leading surface 912 of the wheel spoke 906. According to an aspect, the first foam portion 952 can be disposed flush to the edges 918, 940 and configured to match a contour of the inboard surface 908 of the wheel spoke 906. As also shown, a second foam portion 954 can extend between the inner edge 944 of the trailing side surface 936 of the clad spoke 930 and the inner edge 920 of the trailing surface 914 of the wheel spoke 906. According to another aspect, the second foam portion 954 may be disposed flush to those edges 920, 944 and also configured to match a contour of the inboard surface 908 of the wheel spoke 906. In other words, the foam exposed on the back side of the wheel can be shaped to provide an aero-efficient surface as the front-side to rear-side surface geometry is achieved.

A wheel spoke having this configuration can provide an aero-efficient shape that results from the configuration of both the outboard surface and the inboard surface to reduce pumping losses. According to an aspect, the surface shape of the inboard surface, the outboard surface, and the side surfaces can create a shape for efficient ventilation drag by reducing the pumping effect.

Figure 10:
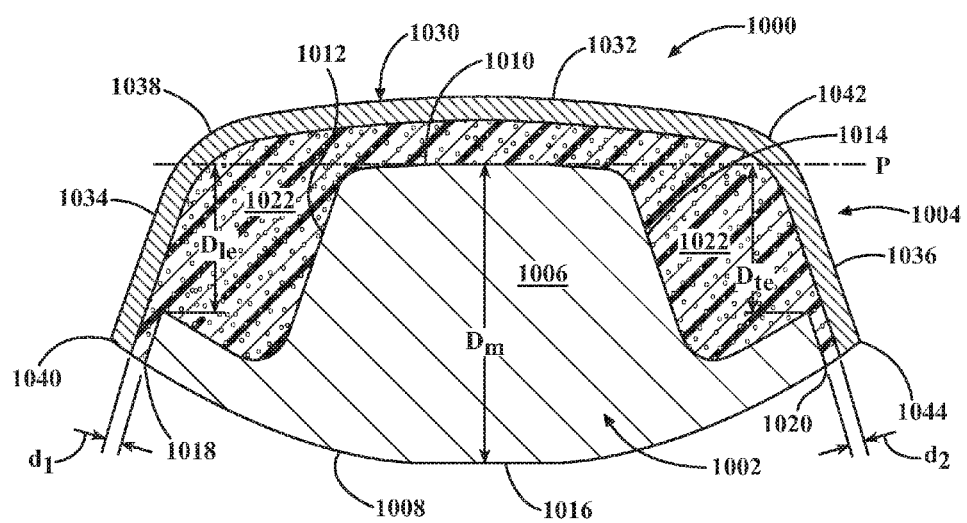
FIG. 10 is a schematic cross-sectional illustration of a wheel spoke design for a wheel assembly in accordance with a further aspect of the present disclosure.

FIG. 10 illustrates still a further exemplary design for a wheel assembly that yields improved aerodynamics through altering the configuration of the inboard side of the wheel spoke. As shown, FIG. 10 is a cross-section of a portion of a wheel assembly 1000 according to an aspect of the present disclosure. The wheel assembly 1000 can include a wheel 1002 and a wheel clad 1004. The basic components of the wheel and wheel clad may be configured, as discussed above. The differences can reside in the configuration of the wheel and clad spoke.

According to an aspect, the wheel spoke 1006 has an inboard surface 1008, an outboard surface 1010, and a leading surface 1012 extending between the inboard surface 1008 and the outboard surface 1010, and a trailing surface 1014 extending between the inboard surface 1008 and the outboard surface 1010. According to another aspect, the inboard surface 1008 is configured with a generally convex shape such that it is generally arcuate in a direction from the leading surface 1012 to the trailing surface 1014 where a generally middle portion 1016 of the inboard surface 1008 is bowed away from the outboard surface 1010 of the spoke 1006. Put another way, the generally middle portion 1016 may be disposed a distance ($D_m$) away from a reference plane (P) defined by the outboard surface 1010 of the spoke 1006. According to another aspect, the middle portion 1016 can be configured with at least a generally planar portion for manufacturing purposes without altering the overall convex shape of the inboard surface 1008. An inner edge 1018 of the leading surface 1012 may be disposed a distance ($D_{le}$) from the reference plane (P). An inner edge 1020 of the trailing surface 1014 may be disposed a distance ($D_{te}$) from the reference plane (P). According to an aspect, distance ($D_m$) can be greater than each of distance ($D_{le}$) and distance ($D_{te}$). According to another aspect, distance ($D_{le}$) may be equal to distance ($D_{te}$). However, distances ($D_{le}$) and ($D_{te}$) do not need to be equal. Again, as discussed above, the spokes could be rotated about its center to change its pitch.

According to an aspect, the outboard surface 1010 of the wheel spoke 1006 can include a pair of weight reduction structures 1022, which can serve to decrease the amount of material that is required to form the wheel spoke. As shown, the weight reduction structures 1022 may be formed in the leading surface 1012 and the trailing surface 1014. The weight reduction structures 1022 may be sized and shaped in order to maximize the removal of material without compromising the strength or structural integrity of the wheel spoke. The weight reduction structures 1022 may obviously take on a variety of different shapes. Alternatively, other weight reducing or relief structures may be employed. Additionally, by placing the weight reduction structures on the outboard side and side surfaces of the spoke, the inboard side of the spoke can be shaped to have increased aerodynamic effect.

According to another aspect, a clad spoke 1030 can overlie the wheel spoke 1006. The clad spoke 1030 can include an outboard surface 1032, a leading side surface 1034, and a trailing side surface 1036. According to a further aspect, the leading side surface 1034 has an outer edge 1038 and an inner edge 1040. The trailing side surface 1036 also has an outer edge 1042 and an inner edge 1044. As shown, the inner edge 1038 of the leading side surface 1034 of the clad spoke 1030 may be spaced a first distance ($d_1$) from the inner edge 1018 of the leading surface 1012 of the wheel spoke 1006. As also shown, the inner edge 1044 of the trailing side surface 1036 of the clad spoke 1030 may be spaced a second distance ($d_2$) from the inner edge 1020 of the trailing surface 1014 of the wheel spoke 1006. According to an aspect, the first distance ($d_1$) and the second distance ($d_2$) may be generally equal. According to a further aspect, the first distance ($d_1$) and the second distance ($d_2$) may be very small such that there is little space between the inner edges 1018, 1020 of the wheel spoke 1006 and the inner edges 1040, 1044 of the clad spoke 1030. By this configuration, the inboard surface 1008 of the wheel spoke 1006 may be almost entirely responsible for the spoke shape. According to an aspect, the foam exposed on the back side of the wheel can be shaped to provide an aero-efficient surface as the front-side to rear-side surface geometry is achieved.

According to another aspect, foam adhesive 1050 may be utilized to fill an area between the wheel spoke 1006 and the clad spoke 1030.

A wheel spoke having this configuration can provide an aero-efficient shape that results from the configuration of both the outboard surface and the inboard surface to reduce pumping losses. According to an aspect, the surface shape of the inboard surface, the outboard surface, and the side surfaces can create a shape for efficient ventilation drag by reducing the pumping effect.

Figure 11:
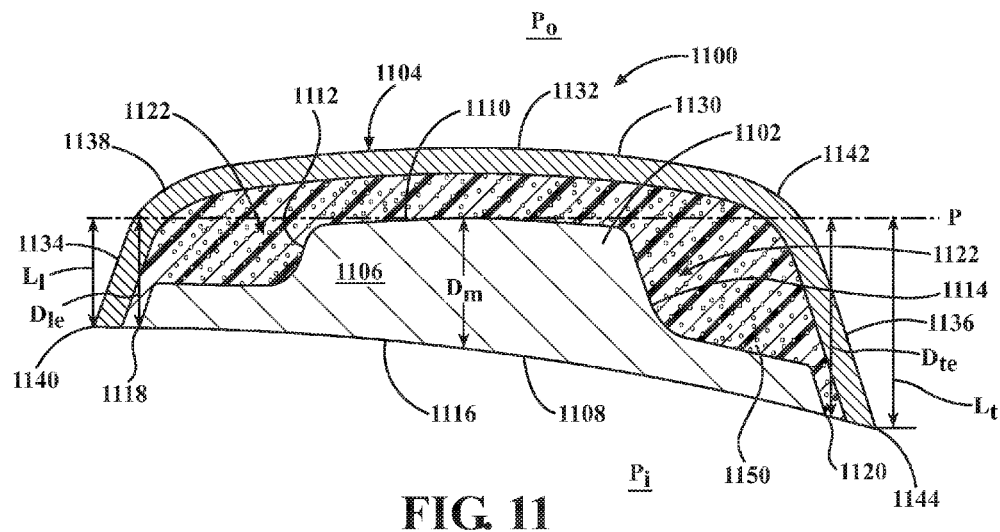
FIG. 11 is a schematic cross-sectional illustration of a wheel spoke design for a wheel assembly in accordance with yet another aspect of the present disclosure.

FIG. 11 illustrates one exemplary design for a wheel assembly that yields improved aerodynamics through altering the configuration of the inboard side of the wheel spoke. As shown, FIG. 11 is a cross-section of a portion of a wheel assembly 1100 according to an aspect of the present disclosure. The wheel assembly 1100 includes a wheel 1102 and a wheel clad 1104. The basic components of the wheel and the wheel clad may be configured as discussed above. The differences can reside in the configuration of the wheel and clad spoke.

According to an aspect, the wheel 1102 includes the wheel spoke 1106 having an inboard surface 1108, an outboard surface 1110, and a leading surface 1112 extending between the inboard surface 1108 and the outboard surface 1110, and a trailing surface 1114 extending between the inboard surface 1108 and the outboard surface 1110. According to another aspect, the inboard surface 1108 may be configured as a generally concave shape such that it is generally arcuate in a direction from the leading surface 1112 to the trailing surface 1114 where a generally middle portion 1116 of the inboard surface 1108 is bowed toward from the outboard surface 1110 of the spoke 1106. Put another way, the generally middle portion 1116 may be disposed a distance ($D_m$) away from a reference plane P defined by the outboard surface 1110 of the spoke 1106. An inner edge 1118 of the leading surface 1112 may be disposed a distance ($D_{le}$) from the reference plane (P). An inner edge 1120 of the trailing surface 1114 may be disposed a distance ($D_{te}$) from the reference plane (P). According to an aspect, distance ($D_m$) may be greater than distance ($D_{le}$) and less than distance ($D_{te}$). However, the relative distances can vary. By this configuration, the leading surface 1112 may be shorter than the trailing surface 1114. According to an aspect, the outboard surface 1110 of the wheel spoke 1106 as defined by the reference plane (P) may be oriented at an angle with respect to the wheel outer surface, as shown. According to a further aspect, the wheel spoke 1106 could be rotated (either clockwise or counter-clockwise) about a center point so that one of the leading surface 1112 or the trailing surface 1114 is lower with respect to the Plane (P) than the other. By this configuration, the length of these surfaces 1112, 1114 could be equal $L_1=L_2$.

According to an aspect, the outboard surface 1100 of the wheel spoke 1106 can include a pair of weight reduction structures 1122, which can serve to decrease the amount of material that is required to form the wheel spoke. As shown, the weight reduction structures may be formed in the leading surface 1112 and the trailing surface 1114. The weight reduction structures 1122 may be sized and shaped in order to maximize the removal of material without compromising the strength or structural integrity of the wheel spoke. The weight reduction structures 1122 may obviously take on a variety of different shapes. Alternatively, other weight reducing or relief structures may be employed. Additionally, by placing the weight reduction structures on the outboard side and side surfaces of the spoke, the inboard side of the spoke can be shaped to have increased aerodynamic effect.

According to another aspect, a clad spoke 1130 can overlie the wheel spoke 1106. The clad spoke 1130 can include an outboard surface 1132, a leading side surface 1134, and a trailing side surface 1136. According to a further aspect, the leading side surface 1134 has an outer edge 1138 and an inner edge 1140. The trailing side surface 1136 also has an outer edge 1142 and an inner edge 1144. According to this aspect, the inner edge 1138 of the leading side surface 1134 of the clad spoke 1130 may be spaced apart generally the same distances as the distance between the inner edge 1144 of the trailing side surface 1136 of the clad spoke 1130 and the inner edge 1120 of the trailing surface 1112 of the wheel spoke 1106. According to an aspect, the leading side surface 1134 of the clad spoke 1130 may have a shorter length ($L_l$) than the length ($L_t$) of the trailing side surface 1136. This configuration can yield a pitch in the wheel spoke that creates a pressure differential between outboard pressure zone (Po) and the inboard pressure zone (Pi). As first distance ($d_1$) between the inner edge 1118 of the wheel spoke leading surface 1112 and the inner edge 1138 of the clad spoke leading side surface 1134 may be very small. Similarly, a second distance ($d_2$) between the inner edge 1144 of the clad spoke trailing side surface 1134 and the inner edge 1120 of the wheel spoke trailing surface 1112 is also very small. By this configuration, the inboard surface 1108 of the wheel spoke 1106 may be almost entirely responsible for the shape if the inner side of the spoke. According to a further aspect, the wheel spoke 1106 could be rotated (either clockwise or counter-clockwise) about a center point so that one of the leading surface 1112 or the trailing surface 1114 is lower with respect to the Plane (P) than the other. By this configuration, the length of these surfaces 1112, 1114 could be equal $L_1=L_2$.

According to another aspect, foam adhesive 1150 may be utilized to fill an area between the wheel spoke 1106 and the clad spoke 1130. A spoke inboard surface 1108 having this configuration can provide an aero-efficient shape that results from the configuration of both the outboard surface and the inboard surface to reduce pumping losses.

Figure 12:
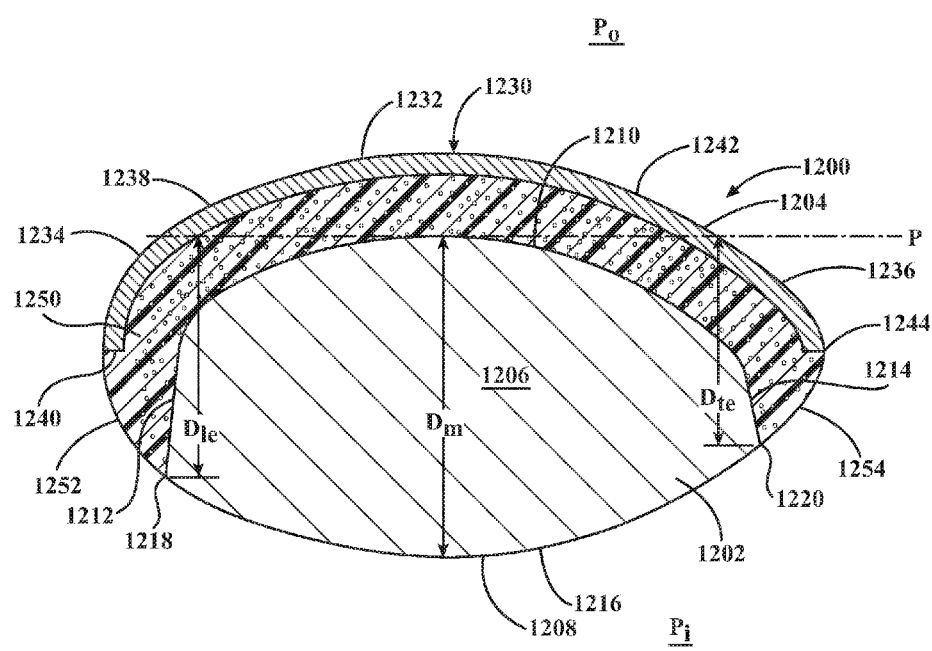
FIG. 12 is a schematic cross-sectional illustration of a wheel spoke design for a wheel assembly in accordance with yet a further aspect of the present disclosure.

FIG. 12 illustrates one exemplary design for a wheel assembly that yields improved aerodynamics through altering the configuration of the inboard side of the wheel spoke. As shown, FIG. 12 is a cross-section of a portion of a wheel assembly 1200 according to an aspect of the present disclosure. The wheel assembly 1200 includes a wheel 1202 and a wheel clad 1204. The basic components of the wheel and the wheel clad may be configured as discussed above. The differences can reside in the configuration of the wheel and the clad spoke.

According to an aspect, the wheel spoke 1206 has an inboard surface 1208, an outboard surface 1210, and a leading surface 1212 extending between the inboard surface 1208 and the outboard surface 1210, and a trailing surface 1214 extending between the inboard surface 1208 and the outboard surface 1210. According to another aspect, the inboard surface 1208 can be configured as a generally convex shape such that it is generally arcuate in a direction from the leading surface 1212 to the trailing surface 1214 with a generally middle portion 1216 of the inboard surface 1208 being bowed away from the outboard surface 1210 of the spoke 1206. Put another way, the generally middle portion 1216 may be disposed a distance ($D_m$) away from a reference plane (P) defined by the outboard surface 1210 of the spoke 1206. An inner edge 1218 of the leading surface 1212 may be disposed a distance ($D_{le}$) from the reference plane (P). An inner edge 1220 of the trailing surface 1214 may be disposed a distance ($D_{te}$) from the reference plane (P). According to an aspect, distance ($D_m$) may be greater than each of distance ($D_{le}$) and distance ($D_{te}$). According to another aspect, distance ($D_{le}$) may be equal to distance ($D_{te}$). However, distances ($D_{le}$) and ($D_{te}$) do not need to be equal. According to a further aspect, the wheel spoke 1206 could be rotated (either clockwise or counter-clockwise) about a center point so that one of the leading surface 1212 or the trailing surface 1214 is lower with respect to the Plane (P) than the other. By this configuration, the length of these surfaces 1212, 1214 could be equal $L_1=L_2$.

According to another aspect, a clad spoke 1230 can overlie the wheel spoke 1206. According to an aspect, the clad spoke 1230 may be generally egg-shaped. As shown, the clad spoke 1230 can include an outboard surface 1232, a leading side surface 1234, and a trailing side surface 1236. According to a further aspect, the leading side surface 1234 has an outer edge 1238 and an inner edge 1240. The trailing side surface 1236 also has an outer edge 1242 and an inner edge 1244. As shown, the leading side surface 1234 and the trailing side surface 1234 may terminate at their inner edges 1240, 1244 adjacent the outboard surface 1232 of the wheel spoke 1206. Additionally, the shapes and degrees of curvature of the leading side surface 1234 and the trailing side surface 1236 may vary. As shown, the leading side surface 1234 may extend inwardly with respect to the clad spoke outboard surface 1232 such that its downturn (as viewed in the FIG) is relatively sharp. According to an aspect, this can generally match the orientation of the wheel spoke leading surface 1212. As also shown, the trailing side surface 1236 may extend inwardly with respect to the clad spoke outboard surface 1232 such that its downturn (as viewed in the FIG) is more gradual. According to an aspect, this can generally match the orientation of the wheel spoke trailing edge 1214.

According to another aspect, foam adhesive 1250 may be utilized to fill an area between the wheel spoke 1206 and the clad spoke 1230. According to another aspect, foam adhesive can be utilized to assist in forming an inboard surface 1208 of the wheel spoke 1206. As shown, a first foam portion 1252 may extend between the inner edge 1240 of the leading side surface 1234 of the clad surface 1230 and the inner edge 1218 of the leading surface 1212 of the wheel spoke 1206. According to an aspect, the first foam portion 1252 can be disposed flush to the edges 1218, 1240 and configured to match a contour of the inboard surface 1208 of the wheel spoke 1206. As also shown, a second foam portion 1254 can extend between the inner edge 1244 of the trailing side surface 1236 of the clad spoke 1230 and the inner edge 1220 of the trailing surface 1214 of the wheel spoke 1206. According to another aspect, the second foam portion 1254 may be disposed flush to those edges 1220, 1244 and also configured to match a contour of the inboard surface 1208 of the wheel spoke 1206. In other words, the foam exposed on the back side of the wheel can be shaped to provide an aero-efficient surface as the front-side to rear-side surface geometry is achieved.

A wheel spoke having this configuration can provide an aero-efficient shape that results from the configuration of both the outboard surface and the inboard surface to reduce pumping losses. According to an aspect, the surface shape of the inboard surface, the outboard surface, and the side surfaces can create a shape for efficient ventilation drag by reducing the pumping effect.

Figure 13:
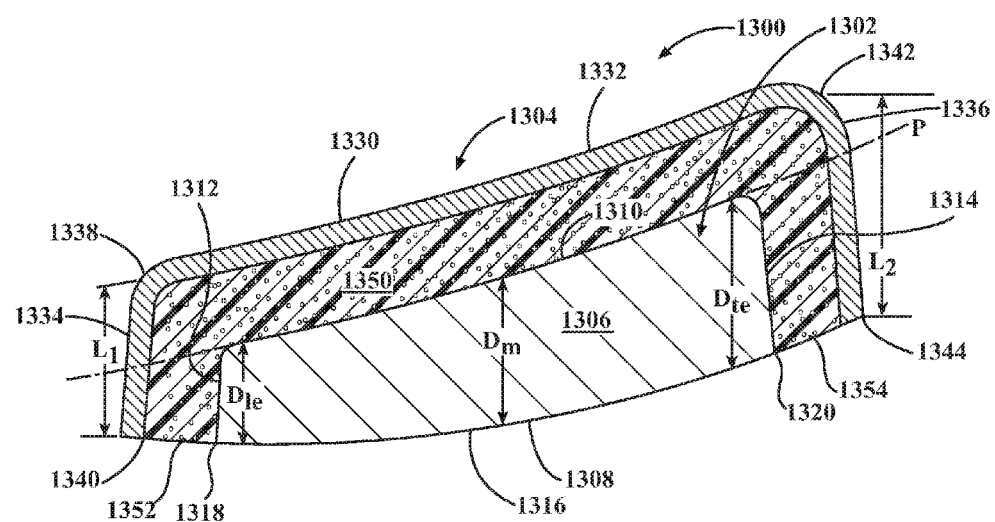
FIG. 13 is a schematic cross-sectional illustration of a wheel spoke design for a wheel assembly in accordance with still another aspect of the present disclosure.

FIG. 13 illustrates one exemplary design for a wheel assembly that yields improved aerodynamics through altering the configuration of the inboard side of the wheel spoke. As shown, FIG. 13 is a cross-section of a portion of a wheel assembly 1300 according to an aspect of the present disclosure. The wheel assembly 1300 can include a wheel 1302 and a wheel clad 1304. The basic components of the wheel and the wheel clad may be configured as discussed above. The differences can reside in the configuration of the wheel and the clad spoke.

According to an aspect, the wheel 1302 includes the wheel spoke 1306 having an inboard surface 1308, an outboard surface 1310, and a leading surface 1312 extending between the inboard surface 1308 and the outboard surface 1310, and a trailing surface 1314 extending between the inboard surface 1308 and the outboard surface 1310. According to another aspect, the inboard surface 1308 may be configured as a generally convex shape such that it is generally arcuate in a direction from the leading surface 1312 to the trailing surface 1314 where a generally middle portion 1316 of the inboard surface 1308 is bowed toward the outboard surface 1310 of the spoke 1306. The outboard surface 1310 may have a similar shape. Put another way, the generally middle portion 1316 may be disposed a distance ($D_m$) away from a reference plane (P) defined by the outboard surface 1310 of the spoke 1306. An inner edge 1318 of the leading surface 1312 may be disposed a distance ($D_{le}$) from the reference plane (P). An inner edge 1320 of the trailing surface 1314 may be disposed a distance ($D_{te}$) from the reference plane (P). According to an aspect, the distance ($D_m$) may be greater than the distance ($D_{le}$) and less than the distance ($D_{te}$). However, the relative distances can vary. By this configuration, the leading surface 1312 may be shorter than the trailing surface 1314. According to an aspect, the outboard surface 1310 of the wheel spoke 1306 as defined by the reference plane may be oriented at an angle with respect to the wheel outer surface. According to a further aspect, the wheel spoke 1306 could be rotated (either clockwise or counter-clockwise) about a center point so that one of the leading surface 1312 or the trailing surface 1314 is lower with respect to the Plane (P) than the other. By this configuration, the length of these surfaces 1312, 1314 could be equal $L_1=L_2$.

According to another aspect, a clad spoke 1330 can overlie the wheel spoke 1306. The clad spoke 1330 can include an outboard surface 1332, a leading side surface 1334, and a trailing side surface 1336. According to a further aspect, the leading side surface 1334 has an outer edge 1338 and an inner edge 1340. The trailing side surface 1336 also has an outer edge 1342 and an inner edge 1344. According to this aspect, the inner edge 1338 of the leading side surface 1334 of the clad spoke 1330 may be spaced apart generally the same distances as the distance between the inner edge 1344 of the trailing side surface 1336 of the clad spoke 1330 and the inner edge 1320 of the trailing surface 1312 of the wheel spoke 1306. According to an aspect, the leading side surface 1334 of the clad spoke 1330 may have a shorter length ($L_l$) than the length ($L_t$) of the trailing side surface 1336. This configuration can yield a pitch in the wheel spoke that creates a pressure differential between outboard pressure zone (Po) and the inboard pressure zone (Pi).

According to another aspect, foam adhesive 1350 may be utilized to fill an area between the wheel spoke 1306 and the clad spoke 1330. According to another aspect, foam adhesive can be utilized to assist in forming an inboard surface 1308 of the wheel spoke 1306. As shown, a first foam portion 1352 may extend between the inner edge 1340 of the leading side surface 1334 of the clad surface 1330 and the inner edge 1318 of the leading surface 1312 of the wheel spoke 1306. According to an aspect, the first foam portion 1352 may be disposed flush to the edges 1318, 1340 and configured to match a contour of the inboard surface 1308 of the wheel spoke 1306. As also shown, a second foam portion 1354 can extend between the inner edge 1344 of the trailing side surface 1336 of the clad spoke 1330 and the inner edge 1320 of the trailing surface 1314 of the wheel spoke 1306. According to another aspect, the second foam portion 1354 may be disposed flush to those edges 1320, 1344 and also configured to match a contour of the inboard surface 1308 of the wheel spoke 1306. In other words, the foam exposed on the back side of the wheel can be shaped to provide an aero-efficient surface as the front-side to rear-side surface geometry is achieved.

A spoke inboard surface 1308 having this configuration can provide an aero-efficient shape that results from the configuration of both the outboard surface and the inboard surface to reduce pumping losses.

Figure 14:
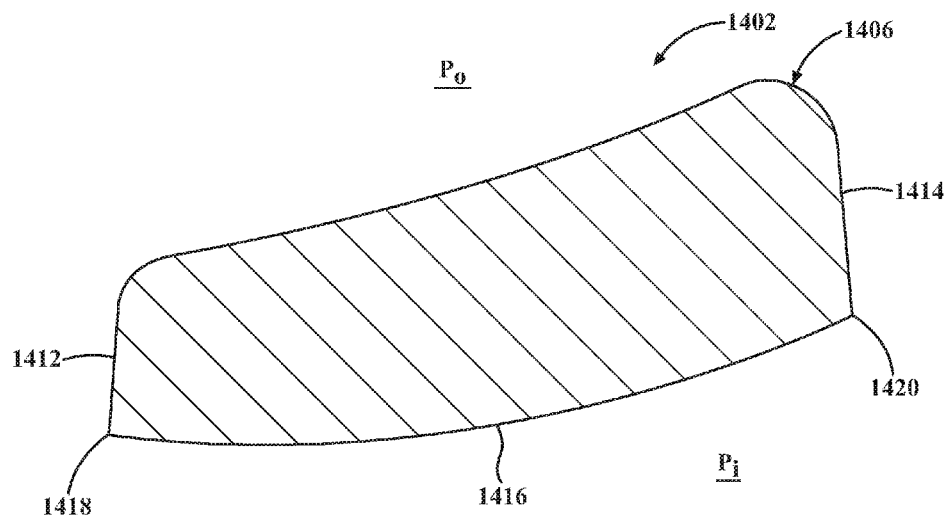
FIG. 14 is a schematic cross-sectional illustration a wheel spoke design in accordance with still yet a further aspect of the present disclosure.

FIG. 14 illustrates an exemplary design for a wheel that yields improved aerodynamics through altering the configuration of the inboard side of the wheel spoke. As shown, FIG. 14 is a cross-section of a portion of wheel 1302 according to an aspect of the present disclosure. The basic components of the wheel may be configured, as discussed above. The differences may reside in the configuration of the wheel spoke. As shown, the wheel spoke 1306 of FIG. 14 has the same configuration as the wheel spoke of FIG. 13. However, with respect to FIG. 14, there is no wheel clad disposed overtop of the wheel surface. According to an aspect, the outboard surface 1410 of the wheel spoke and thus the wheel is exposed. The outboard surface of the wheel, including the wheel spoke geometry are configured to provide the aerodynamic benefits.

Figure 15:
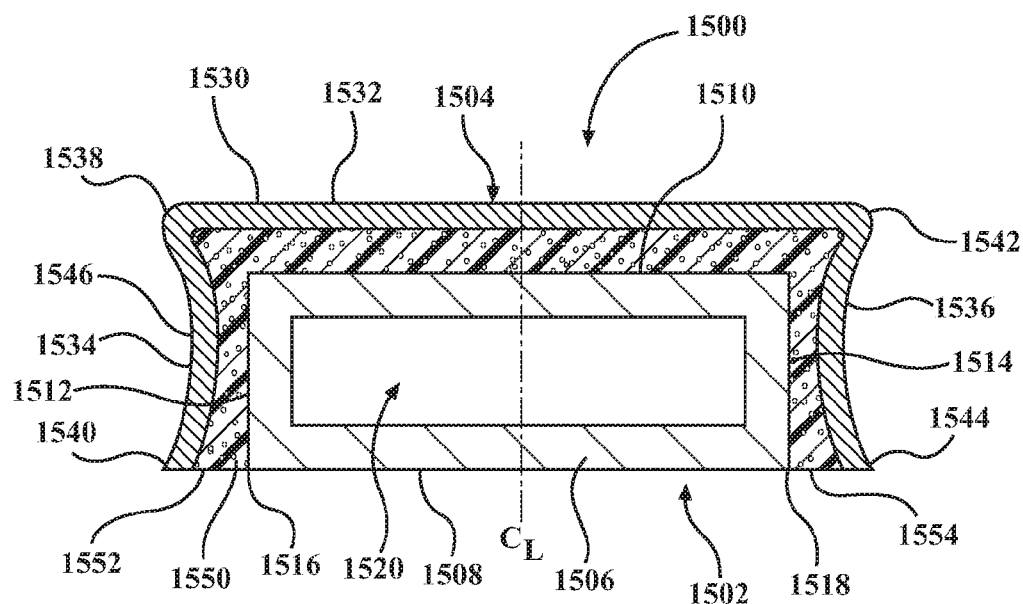
FIG. 15 is a schematic cross-sectional illustration of a wheel spoke design in accordance with still another aspect of the present disclosure.

FIG. 15 illustrates another exemplary design for a wheel assembly that yields improved aerodynamics through altering the configuration of the leading edge and trailing edge of the wheel clad. As shown, FIG. 15 is a cross-section of a portion of a wheel assembly 1500 according to an aspect of the present disclosure. The wheel assembly 1500 can include a wheel 1502 and a wheel clad 1504. The basic components of the wheel and the wheel clad may be configured as discussed above. The differences can reside in the configuration of the wheel and the clad spoke.

According to an aspect, the wheel 1502 includes a wheel spoke 1506 having an inboard surface 1508, an outboard surface 1510, a leading surface 1512 extending between the inboard surface 1508 and the outboard surface 1510, and a trailing surface 1514 extending between the inboard surface 1508 and the outboard surface 1510. According to another aspect, the inboard surface 1508 and the outboard surface 1510 may each be generally planar and parallel to one another. Similarly, the wheel leading surface 1512 and the wheel trailing surface 1514 may be configured as generally planar surfaces that are parallel to one another. However, the surfaces could each have a variety of different configurations. For example, the wheel spoke surfaces can match the configuration of the clad spoke surfaces, as discussed below. According to a further aspect, the wheel spoke 1506 can include one or more pockets 1520 formed in its interior. For example, the wheel spoke 1506 may be formed by a hollow core casting process such that the pockets 1520 are formed in the spoke interiors such that they spokes are generally hollow. As will be appreciated, interior spoke pockets can decrease the weight of the wheel without affecting its structural integrity, which can provide a lighter wheel assembly resulting in improved fuel economy for a vehicle as well as other aerodynamic benefits. It will be appreciated that hollow pockets in the spokes can be formed in a variety of different ways by a variety of different processes. It will further be appreciated that the pockets 1520 can have a variety of different configurations.

According to another aspect, a clad spoke 1530 can overlie the wheel spoke 1506. The clad spoke 1530 can include an outboard surface 1532, a leading side surface 1534, and a trailing side surface 1536. According to a further aspect, the leading side surface 1534 has an outer edge 1538 adjacent the outboard surface 1532 and an inner edge 1540 opposite the outer edge 1538. The trailing side surface 1536 also has an outer edge 1542 adjacent the outboard surface 1532 and an inner edge 1544 opposite the outer edge 1538. According to this aspect, the leading side surface 1534 may be configured as a generally concave shape such that it is generally arcuate in a direction from the outer edge 1538 to the inner edge 1540 where a generally middle portion 1546 of the leading side surface 1534 is bowed inwardly. The trailing side surface 1536 may have a similar shape. According to a still further aspect, the trailing side surface 1536 may have a different shape than the leading side surface 1534. Further, the trailing and leading side surfaces 1536, 1534 may have other non-planar shapes.

According to another aspect, foam adhesive 1550 may be utilized to fill an area between the wheel spoke 1506 and the clad spoke 1530. According to another aspect, foam adhesive can be utilized to assist in forming the inboard surface 1508 of the wheel spoke 1506. As shown, a first foam portion 1552 may extend between the inner edge 1540 of the leading side surface 1534 of the clad surface 1530 and an inner edge 1516 of the leading surface 1512 of the wheel spoke 1506. According to an aspect, the first foam portion 1552 may be disposed flush to the edges 1518, 1540 and configured to match a contour of the inboard surface 1508 of the wheel spoke 1506. As also shown, a second foam portion 1554 can extend between the inner edge 1544 of the trailing side surface 1536 of the clad spoke 1530 and an inner edge 1518 of the trailing surface 1514 of the wheel spoke 1506. According to another aspect, the second foam portion 1554 may be disposed flush to those edges 1520, 1544 and also configured to match a contour of the inboard surface 1508 of the wheel spoke 1506. In other words, the foam exposed on the back side of the wheel can be shaped to provide an aero-efficient surface as the front-side to rear-side surface geometry is achieved.

A spoke leading side surface 1534 having this configuration can provide an aero-efficient shape that results from the configuration of both the outboard surface and the inboard surface to reduce pumping losses.

Figure 16:
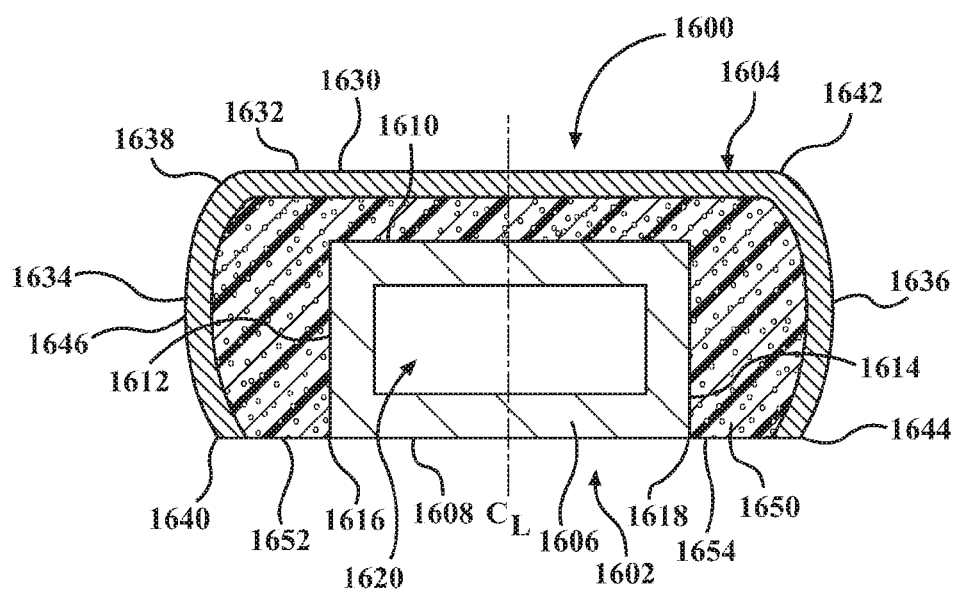
FIG. 16 is a schematic cross-sectional illustration of a wheel spoke design in accordance with yet a further aspect of the present disclosure.

FIG. 16 illustrates another exemplary design for a wheel assembly that yields improved aerodynamics through altering the configuration of the leading edge and trailing edge of the wheel clad. As shown, FIG. 16 is a cross-section of a portion of a wheel assembly 1600 according to an aspect of the present disclosure. The wheel assembly 1600 can include a wheel 1602 and a wheel clad 1604. The basic components of the wheel and the wheel clad may be configured as discussed above. The differences can reside in the configuration of the wheel and the clad spoke.

According to an aspect, the wheel 1602 includes a wheel spoke 1606 having an inboard surface 1608, an outboard surface 1610, a leading surface 1612 extending between the inboard surface 1608 and the outboard surface 1610, and a trailing surface 1614 extending between the inboard surface 1608 and the outboard surface 1610. According to another aspect, the inboard surface 1608 and the outboard surface 1610 may each be generally planar and parallel to one another. Similarly, the wheel leading surface 1612 and the wheel trailing surface 1614 may be configured as generally planar surfaces that are parallel to one another. However, the surfaces could each have a variety of different configurations. For example, the wheel spoke surfaces can match the configuration of the clad spoke surfaces, as discussed below. According to a further aspect, the wheel spoke 1606 can include one or more pockets 1620 formed in its interior. For example, the wheel spoke 1606 may be formed by a hollow core casting process such that the pockets 1620 are formed in the spoke interiors such that they spokes are generally hollow. As will be appreciated, interior spoke pockets can decrease the weight of the wheel without affecting its structural integrity, which can provide a lighter wheel assembly resulting in improved fuel economy for a vehicle as well as other aerodynamic benefits. It will be appreciated that hollow pockets in the spokes can be formed in a variety of different ways by a variety of different processes. It will further be appreciated that the pockets 1620 can have a variety of different configurations.

According to another aspect, a clad spoke 1630 can overlie the wheel spoke 1606. The clad spoke 1630 can include an outboard surface 1632, a leading side surface 1634, and a trailing side surface 1636. According to a further aspect, the leading side surface 1634 has an outer edge 1638 adjacent the outboard surface 1632 and an inner edge 1640 opposite the outer edge 1638. The trailing side surface 1636 also has an outer edge 1642 adjacent the outboard surface 1632 and an inner edge 1644 opposite the outer edge 1638. According to this aspect, the leading side surface 1634 may be configured as a generally convex shape such that it is generally arcuate in a direction from the outer edge 1638 to the inner edge 1640 where a generally middle portion 1646 of the leading side surface 1634 is bowed outwardly. The trailing side surface 1636 may have a similar shape. According to a still further aspect, the trailing side surface 1636 may have a different shape than the leading side surface 1634. Further, the trailing and leading side surfaces 1636, 1634 may have other non-planar shapes.

According to another aspect, foam adhesive 1650 may be utilized to fill an area between the wheel spoke 1606 and the clad spoke 1630. According to another aspect, foam adhesive 1650 can be utilized to assist in forming the inboard surface 1608 of the wheel spoke 1606. As shown, a first foam portion 1652 may extend between the inner edge 1640 of the leading side surface 1634 of the clad surface 1630 and an inner edge 1616 of the leading surface 1612 of the wheel spoke 1606. According to an aspect, the first foam portion 1652 may be disposed flush to the edges 1618, 1640 and configured to match a contour of the inboard surface 1608 of the wheel spoke 1606. As also shown, a second foam portion 1654 can extend between the inner edge 1644 of the trailing side surface 1636 of the clad spoke 1630 and an inner edge 1618 of the trailing surface 1614 of the wheel spoke 1606. According to another aspect, the second foam portion 1654 may be disposed flush to those edges 1620, 1644 and also configured to match a contour of the inboard surface 1608 of the wheel spoke 1606. In other words, the foam exposed on the back side of the wheel can be shaped to provide an aero-efficient surface as the front-side to rear-side surface geometry is achieved.

A spoke leading side surface 1634 having this configuration can provide an aero-efficient shape that results from the configuration of both the outboard surface and the inboard surface to reduce pumping losses.

Figure 17:
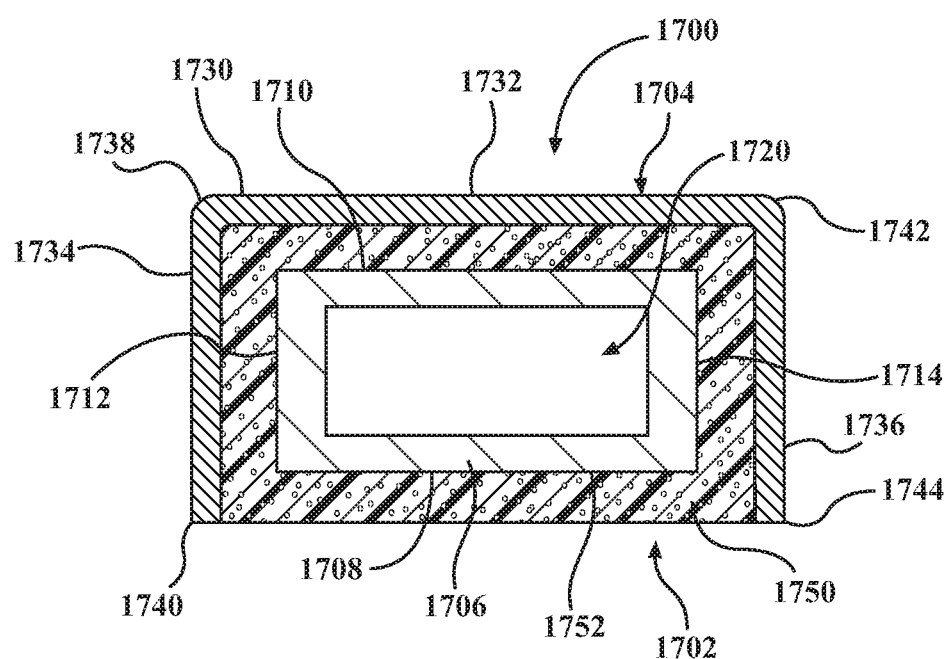
FIG. 17 is a schematic cross-sectional illustration of a wheel spoke design in accordance with yet another aspect of the present disclosure.

FIG. 17 illustrates another exemplary design for a wheel assembly that yields improved aerodynamics through altering the configuration of the inboard side and outboard side of the wheel clad. As shown, FIG. 17 is a cross-section of a portion of a wheel assembly 1700 according to an aspect of the present disclosure. The wheel assembly 1700 can include a wheel 1702 and a wheel clad 1704. The basic components of the wheel and the wheel clad may be configured as discussed above. The differences can reside in the configuration of the wheel and the clad spoke.

According to an aspect, the wheel 1702 includes a wheel spoke 1706 having an inboard surface 1708, an outboard surface 1710, a leading surface 1712 extending between the inboard surface 1708 and the outboard surface 1710, and a trailing surface 1714 extending between the inboard surface 1708 and the outboard surface 1710. According to another aspect, the inboard surface 1708 and the outboard surface 1710 may each be generally planar and parallel to one another. Similarly, the wheel leading surface 1712 and the wheel trailing surface 1714 may be configured as generally planar surfaces that are parallel to one another. However, the surfaces could each have a variety of different configurations. According to a further aspect, the wheel spoke 1706 can include one or more pockets 1720 formed in its interior. For example, the wheel spoke 1706 may be formed by a hollow core casting process such that the pockets 1720 are formed in the spoke interiors such that they spokes are generally hollow. As will be appreciated, interior spoke pockets can decrease the weight of the wheel without affecting its structural integrity, which can provide a lighter wheel assembly resulting in improved fuel economy for a vehicle as well as other aerodynamic benefits. It will be appreciated that hollow pockets in the spokes can be formed in a variety of different ways by a variety of different processes. It will further be appreciated that the pockets 1720 can have a variety of different configurations.

According to another aspect, a clad spoke 1730 can overlie the wheel spoke 1706. The clad spoke 1730 can include an outboard surface 1732, a leading side surface 1734, and a trailing side surface 1736. According to a further aspect, the leading side surface 1734 has an outer edge 1738 adjacent the outboard surface 1732 and an inner edge 1740 opposite the outer edge 1738. The trailing side surface 1736 also has an outer edge 1742 adjacent the outboard surface 1732 and an inner edge 1744 opposite the outer edge 1738. According to this aspect, the leading side surface 1734 and the trailing side surface 1736 may have a variety of different configurations.

According to another aspect, foam adhesive 1750 may be utilized to fill an area between the wheel spoke 1706 and the clad spoke 1730. According to another aspect, foam adhesive can be utilized to assist in forming the inboard side of the wheel assembly 1700. As shown, the inboard surface 1752 of the wheel 1708 may be recessed with respect to the inner edge 1740 of the leading side surface 1734 and the inner edge 1744 of the trailing side surface 1736. According to this aspect, the foam adhesive 1750 may fully encapsulate the wheel spoke 1706 such that its forms the inboard side 1752 of the wheel assembly. According to another aspect, the adhesive foam 1750 may be disposed flush with the inner edge 1740 of the leading side surface 1734 and the inner edge 1744 of the trailing side surface 1736. Utilization of the foam adhesive 1750 to form the inboard side of the wheel assembly 1700 allows the inboard side 1752 to be formed in a variety of shapes, including planar, curved, convex, and concave. A variety of other shapes may also be employed.

A wheel assembly 1700 having this configuration can provide an aero-efficient shape that results from the configuration of both the outboard surface and the inboard surface to reduce pumping losses.

Other variants could also be employed as well as any combination of features from the aspects above. As will be appreciated according to the disclosure wheel and the cladding collectively can provide aero-efficient surface geometry on the front and the back side of the wheel. According to an aspect, the shape of the spoke can be achieved by moving the parting line of a wheel mold, or forging die, to the center section of the spoke relative to the face and back surface of the spoke. The parting line left on the wheel spoke surface could be covered by a cladding or other decorative insert that would also provide a decorative and aero-efficient shape to the front side of the spoke. The efficient surface geometry transitions and the shape of the wheel backbone, enabled by the move of the mold or die parting line on the backbone wheel to a more center location on the spoke relative to the spoke face and rear surface, can be achieved on either the leading-edge, trailing edge, or on both edges of the spoke.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A wheel for a vehicle, comprising:
   an inner hub portion configured to receive a vehicle axle therethrough and defining an axis of rotation at a center thereof;
   an outer rim portion;
   a plurality of wheel spoke portions extending generally between the inner hub portion and the outer rim portion;
   the inner hub portion, the outer rim portions, and the plurality of wheel spoke portions cooperate to form a wheel outer surface having a plurality of turbine openings;

wherein each of the plurality of wheel spoke portions has an outboard side adjacent the wheel outer surface, an inboard side opposite the outboard side, a leading side surface extending generally in a direction between the inner hub portion and the outer rim portion and between the outboard side and the inboard side, and a trailing side surface extending generally in a direction between the inner hub portion and the outer rim portion and extending between the outboard side and the inboard side in spaced relationship with the leading side surface and opposite the leading side surface;

a plurality of clad spokes each overlying one of the wheel spoke portions, each of the clad spokes including an outboard surface overlying the outboard side of the wheel spoke portion, a leading side surface overlying the leading side surface of the wheel spoke portion, and a trailing side surface overlying the trailing side surface of the wheel spoke portion; and at least one of the leading and trailing side surfaces of each of the clad spokes has a concave shape arcing toward the other of the leading and trailing side surfaces substantially across its length to provide improved aerodynamic performance of the wheel.

2. A wheel as set forth in claim 1 wherein the other of the leading and trailing side surfaces of each of the clad spokes has a convex shape arcing away from the other of the leading and trailing side surfaces substantially across its length.

3. A wheel as set forth in claim 1 wherein the leading side surface of each of the clad spokes has an outer edge adjacent to the outboard surface and an inner edge opposite the outer edge, and the trailing edge surface of each of the clad spokes has an outer edge adjacent to the outboard surface and an inner edge opposite the outer edge.

4. A wheel as set forth in claim 3 wherein the leading side surface has a generally concave shape from the outer edge to the inner edge, and wherein a middle portion of the leading side surface is arced inwardly toward the trailing side surface.

5. A wheel as set forth in claim 3 wherein the leading side surface has a generally convex shape from the outer edge to the inner edge, and wherein a middle portion of the leading side surface is arced outwardly away from the trailing side surface.

6. A wheel as set forth in claim 3 wherein the trailing side surface has a generally concave shape from the outer edge to the inner edge, and wherein a middle portion of the trailing side surface is arced inwardly toward the leading side surface.

7. A wheel as set forth in claim 3 wherein the trailing side surface has a generally convex shape from the outer edge to the inner edge, and wherein a middle portion of the trailing side surface is arced outwardly away from the leading side surface.

8. A wheel as set forth in claim 1 wherein each of the wheel spoke portions defines at least one pocket.

9. A wheel as set forth in claim 3 wherein a foam adhesive is disposed between each of the wheel spoke portions and the overlying clad spoke.

10. A wheel as set forth in claim 9 wherein the foam adhesive includes a first foam portion extending between the inner edge of the leading side surface of the clad spoke and an inner edge of the leading surface of the wheel spoke portion.

11. A wheel as set forth in claim 10 wherein the first foam portion is disposed flush to the inner edges and is configured to match a contour of the inboard surface of the wheel spoke.

12. A wheel as set forth in claim 9 wherein a second foam portion extends between the inner edge of the trailing side surface of the clad spoke and an inner edge of the trailing side surface of the wheel spoke portion.

13. A wheel as set forth in claim 12 wherein the second foam portion is disposed flush to the inner edges and also configured to match a contour of the inboard surface of the wheel spoke.

14. A wheel for a vehicle, comprising:

an inner hub portion configured to receive a vehicle axle therethrough and defining an axis of rotation at a center thereof;

an outer rim portion;

a plurality of wheel spoke portions extending generally between the inner hub portion and the outer rim portion;

the inner hub portion, the outer rim portions, and the plurality of wheel spoke portions cooperate to form a wheel outer surface having a plurality of turbine openings;

wherein each of the plurality of wheel spoke portions has an outboard side adjacent the wheel outer surface, an inboard side opposite the spoke outboard side, a leading side surface extending generally in a direction between the inner hub portion and the outer rim portion and between the outboard side and the inboard side, and a trailing side surface extending generally in a direction between the inner hub portion and the outer rim portion and extending between the outboard side and the inboard side in spaced relationship with the leading side surface and opposite the leading side surface;

a plurality of clad spokes each overlying at least a segment of one of the wheel spoke portions;

a foam adhesive disposed between each of the wheel spokes and the overlying clad spoke; and the foam adhesive overlying the inboard surface of each of the wheel spokes, thereby improving the aerodynamic performance of the wheel.

15. A wheel for a vehicle as set forth in claim 14 wherein each of the clad spokes includes an outboard surface overlying the outboard side of the wheel spoke portion, a leading side surface overlying the leading side surface of the wheel spoke portion, and a trailing side surface overlying the trailing side surface of the wheel spoke portion; and wherein the leading side surface of the clad spoke has outer edge adjacent the outboard surface and an inner edge opposite the outer edge; and wherein the trailing side surface of the clad spoke has an outer edge adjacent the outboard surface and an inner edge opposite the outer edge.

16. A wheel for a vehicle as set forth in claim 15 wherein the foam adhesive encapsulates the entire wheel spoke portion.

17. A wheel for a vehicle as set forth in claim 15 wherein the inboard surface of each of the wheel spoke portions is recessed with respect to the inner edge of the leading side surface of the overlying clad spoke and the inner edge of the trailing side surface of the overlying clad spokes; and wherein the adhesive foam is disposed between the inboard surface of each of the wheel spoke portions and the inner edge of the leading side surface of the overlying clad spoke and the trailing edge of the trailing side surface of the clad spoke.

18. A wheel for a vehicle as set forth in claim 17 wherein the adhesive foam is disposed flush with the inner edge of the leading side surface of the clad spoke and the inner edge of the trailing side surface of the clad spoke.

19. A wheel as set forth in claim 14 wherein each of the wheel spoke portions defines at least one pocket.

\* \* \* \* \*